US011820284B2

(12) United States Patent
Kasuya et al.

(10) Patent No.: US 11,820,284 B2
(45) Date of Patent: Nov. 21, 2023

(54) VEHICLE ILLUMINATION DEVICE AND VEHICLE DOOR

(71) Applicant: TS TECH CO., LTD., Saitama (JP)

(72) Inventors: Kenta Kasuya, Tochigi (JP); So Ono, Tochigi (JP); Tomoya Takahashi, Tochigi (JP); Manabu Mihira, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/273,227

(22) PCT Filed: Aug. 6, 2019

(86) PCT No.: PCT/JP2019/030882
§ 371 (c)(1),
(2) Date: Mar. 3, 2021

(87) PCT Pub. No.: WO2020/049931
PCT Pub. Date: Mar. 12, 2020

(65) Prior Publication Data
US 2021/0354623 A1    Nov. 18, 2021

(30) Foreign Application Priority Data

Sep. 5, 2018 (JP) ................................ 2018-165747
Sep. 5, 2018 (JP) ................................ 2018-165748
Feb. 19, 2019 (JP) ................................ 2019-027803

(51) Int. Cl.
*B60Q 3/217*    (2017.01)
*F21V 8/00*    (2006.01)

(52) U.S. Cl.
CPC ............. *B60Q 3/217* (2017.02); *G02B 6/001* (2013.01)

(58) Field of Classification Search
CPC ................................ B60Q 3/217; G02B 6/001
See application file for complete search history.

(56) References Cited

U.S. PATENT DOCUMENTS 6,286,970 B1 *  9/2001  Egawa ................. G02B 6/0028
                                                              362/558
8,070,341 B2 *  12/2011  Chinniah ............... G02B 6/001
                                                              362/555

(Continued)

FOREIGN PATENT DOCUMENTS

JP    H 10-133026 A    5/1998
JP    2008-262743 A    10/2008

(Continued)

OTHER PUBLICATIONS

International Search Report for PCT/JP2019/030882 dated Sep. 24, 2019 (3 pages).

(Continued)

*Primary Examiner* — Fatima N Farokhrooz
(74) *Attorney, Agent, or Firm* — Dority & Manning, PA

(57) ABSTRACT

A vehicle illumination device includes a light source and a long light guide body that extends linearly in a direction of entry of light from one end thereof disposed so as to be adjacent to the light source and radiates light from a linear light-emitting face, the light guide body having formed thereon projecting parts arranged in a longitudinal direction on a back face of the light-emitting face and extending in a direction orthogonal to the direction of entry of light. The widths of the projecting part vary in accordance with the distance from the light source. Provided is a vehicle illumination device that enables light emission with uniform luminance in the longitudinal direction to be realized while improving the productivity of a light guide body.

9 Claims, 27 Drawing Sheets

(56) References Cited

U.S. PATENT DOCUMENTS

| | | | | |
|---|---|---|---|---|
| 10,480,745 B1 * | 11/2019 | Li | ................... | F21S 43/245 |
| 10,634,837 B2 * | 4/2020 | Liu | ................... | G02B 6/00 |
| 2012/0275190 A1 * | 11/2012 | Matsumoto | .......... | G02B 6/0036 |
| | | | | 362/621 |
| 2014/0063414 A1 * | 3/2014 | Kim | .................. | G02B 6/0035 |
| | | | | 362/606 |
| 2015/0239394 A1 | 8/2015 | Willerton | | |

FOREIGN PATENT DOCUMENTS

| | | | | | |
|---|---|---|---|---|---|
| JP | 2009279999 A | * | 12/2009 | | |
| JP | 2010/070126 A | | 4/2010 | | |
| JP | 2014/192797 A | | 10/2014 | | |
| JP | 2016035855 A | | 3/2016 | | |
| JP | 2016/117398 A | | 6/2016 | | |
| JP | 2016-199219 A | | 12/2016 | | |
| JP | 2017-139059 A | | 8/2017 | | |
| JP | 2017139059 | * | 8/2017 | ........... | G06F 13/161 |
| WO | WO2017/069008 A1 | | 4/2017 | | |
| WO | WO2018/020997 A1 | | 2/2018 | | |

OTHER PUBLICATIONS

Japanese Office Action (w/ English translation) for corresponding Application No. 2019-184154, dated Jul. 5, 2023, 7 pages.

* cited by examiner

FIG.19
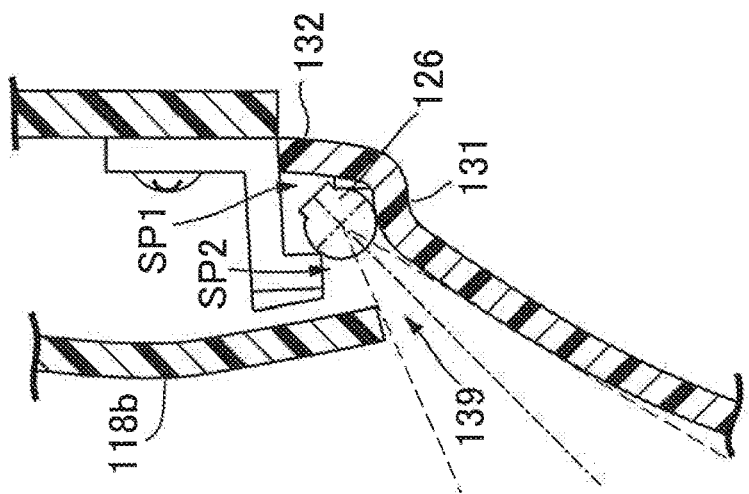
(A)
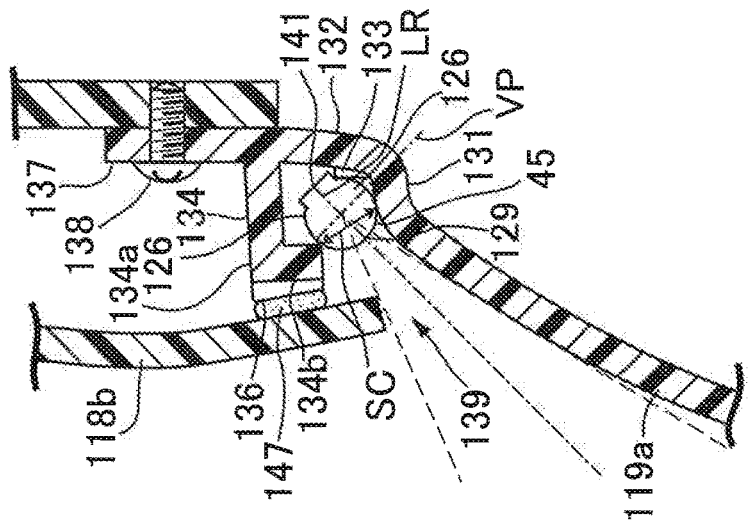
(B)
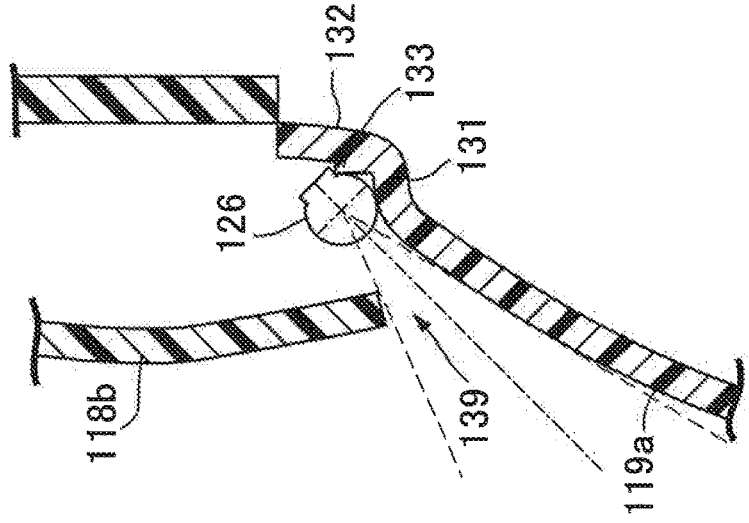
(C)

FIG.24
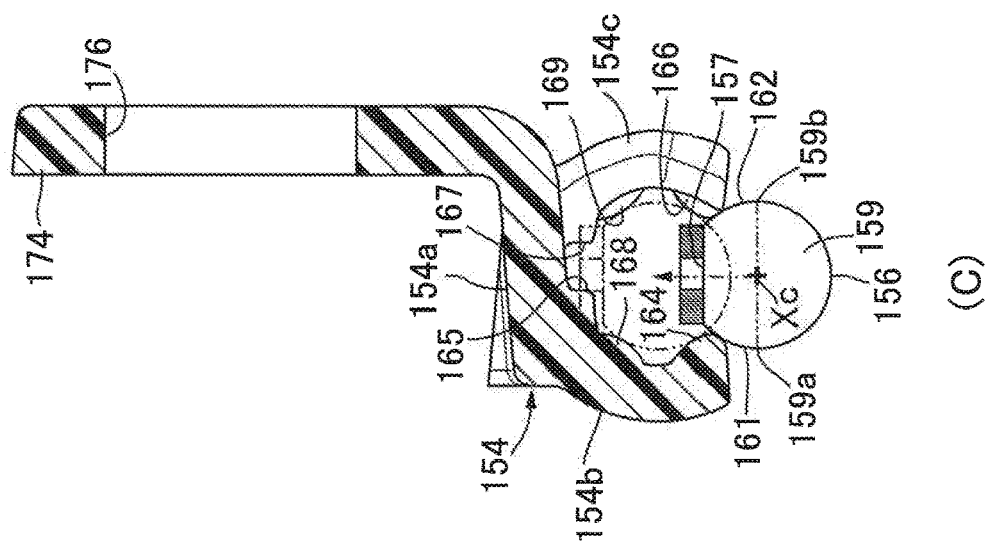
(A)
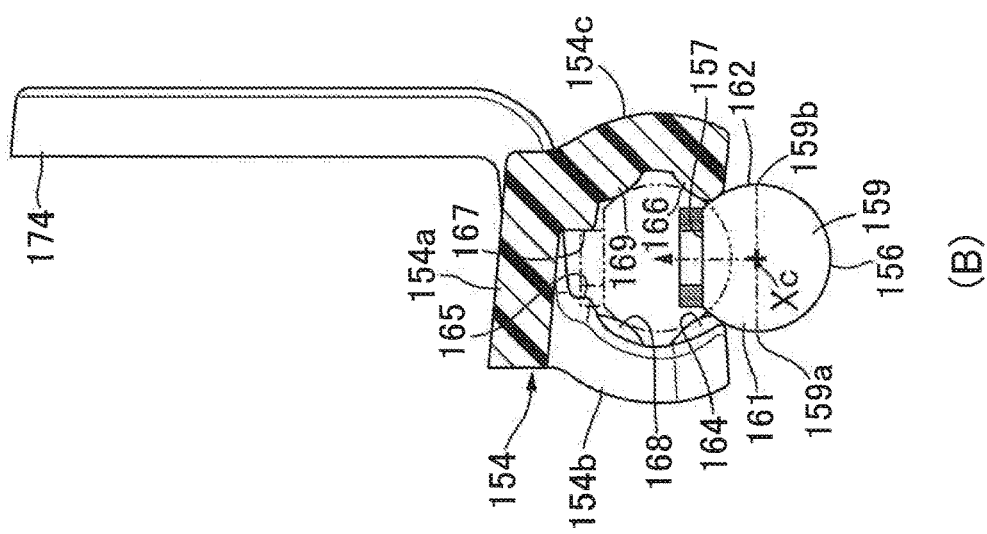
(B)
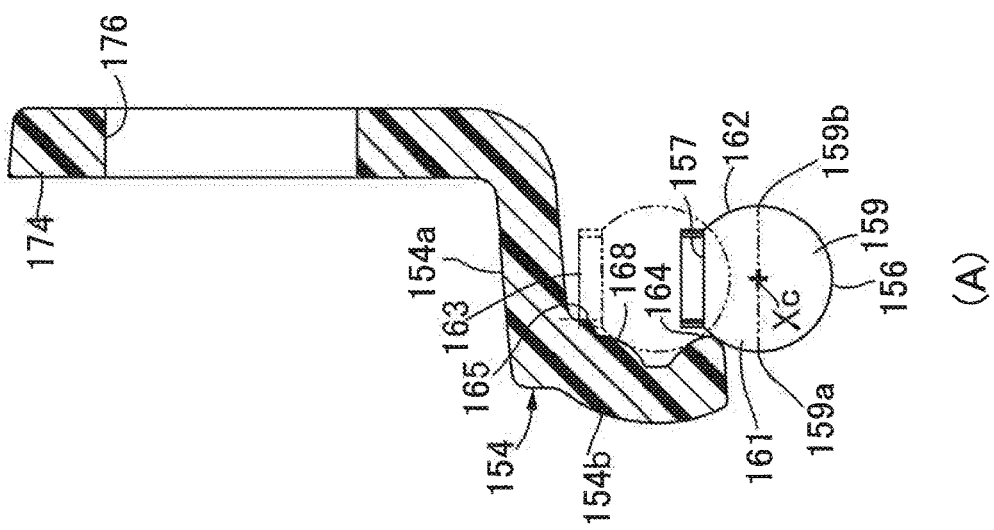
(C)

VEHICLE ILLUMINATION DEVICE AND VEHICLE DOOR

CROSS REFERENCE TO RELATED APPLICATIONS

This application is the U.S. National Stage entry of International Application No. PCT/JP2019/030882 filed under the Patent Cooperation Treaty having a filing date of Aug. 6, 2019, which claims priority to Japanese Patent Application No. 2018-165747 having a filing date of Sep. 5, 2018, Japanese Patent Application No. 2018-165748 having a filing date of Sep. 5, 2018, and Japanese Patent Application No. 2019-027803 having a filing date of Feb. 19, 2019, all of which are incorporated herein by reference.

TECHNICAL FIELD

The present invention relates to a vehicle illumination device that includes a light source and a long light guide body that extends linearly in a direction of entry of light from one end thereof disposed so as to be adjacent to the light source and radiates light from a linear light-emitting face, and a vehicle door using same.

BACKGROUND ART

Patent Document 1 discloses a vehicle interior line illumination device that forms a linear light-emitting face. The line illumination device includes a long light guide body that introduces light of a light source from one end in the longitudinal direction and radiates the light via the linear light-emitting face. The light guide body has formed in a back face of the light-emitting face a large number of incisions arranged in the longitudinal direction and extending in a direction orthogonal to the direction of entry of light. Due to the depth of incisions gradually increasing according to the distance from the light source, light emission with uniform luminance in the longitudinal direction is realized.

Patent Document 2 discloses a vehicle interior line illumination device that has a light-emitting face formed into a linear shape. The line illumination device includes a long light guide body that radiates light via the linear light-emitting face. Light of a light source is introduced into the light guide body from one end in the longitudinal direction. The light guide body is fitted with a long lens extending in the longitudinal direction along the light-emitting face. The lens has formed therein a groove that extends in the longitudinal direction and receives the light guide body.

Patent Document 3 discloses a door lining (vehicle interior component) that leaks light of a light guide body into a compartment via a gap between a switch panel and an arm rest. A housing groove housing the light guide body is formed in the arm rest. The arm rest has a guide face that guides movement of the light guide body toward the housing groove, and a rib that is made to face the guide face within the housing groove and presses the light guide body against the guide face based on elasticity. The light guide body is thus fixed without rattling.

PRIOR ART DOCUMENTS

Patent Documents

Patent Document 1: International Patent Application Laid-open No. 2014/192797

Patent Document 2: Japanese Patent Application Laid-open No. 2010-70126

Patent Document 3: Japanese Patent Application Laid-open No. 2016-117398

SUMMARY OF THE INVENTION

Problems to be Solved by the Invention

When forming a light guide body, the use of a molding technique is desirable. If an incision is formed in a back face of a light-emitting face based on the shape of a mold when molding the light guide body, the operation of cutting an incision can be omitted, the productivity of the light guide body is improved, and the production cost is reduced. However, it is very difficult to machine with good precision a mold so as to have a projection having a height that varies according to change in depth of an incision.

In Patent Document 2, since the light guide body is retained by being fitted into the groove of the lens, if relative movement occurs in the direction of a plane between the light guide body and the lens in response to vibration, etc. of the vehicle body, a 'kyu kyu' rubbing sound could occur based on frictional vibration of the light guide body and the lens. Such a rubbing sound can be unpleasant to the ear of an occupant within the vehicle compartment.

As disclosed in Patent Document 3, a channel extending linearly in the direction of entry of the light is formed in the rod-shaped light guide body. A claw that is made to face the guide face within the housing groove is engaged with the channel. The claw allows movement of the light guide body passing through between the claw and the guide face and entering the housing groove, but prevents the light guide body from disengaging from the housing groove by engaging with the channel. The light guide body is thus retained within the housing groove of the arm rest. Since the light guide body is required to have a channel formed therein, the shape of the light guide body is restricted.

The object of the present invention is to provide a vehicle illumination device that enables light emission with uniform luminance in the longitudinal direction to be realized while improving the productivity of a light guide body.

Furthermore, the object of the present invention is to provide a vehicle illumination device that can suppress the sound of rubbing between a light guide body and a lens.

Moreover, the object of the present invention is to provide a vehicle interior component that enables a light guide body to be well fixed thereto while increasing the degree of freedom in shape of the light guide body.

Means for Solving the Problems

According to a first aspect of the present invention, there is provided a vehicle illumination device comprising a light source, and a long light guide body that extends linearly in a direction of entry of light from one end thereof disposed so as to be adjacent to the light source and radiates light from a linear light-emitting face, the light guide body having formed thereon projecting parts or recess parts arranged in a longitudinal direction on a back face of the light-emitting face and extending in a direction orthogonal to the direction of entry of light, characterized in that a length of the projecting part or recess part in a direction orthogonal to the direction of entry of light changes according to a distance from the light source.

According to a second aspect, in addition to the first aspect, the length of the projecting part or recess part increases in going away from the light source.

According to a third aspect of the present invention, in addition to the first or second aspect, the projecting parts or recess parts are arranged with a constant pitch in the longitudinal direction.

According to a fourth aspect of the present invention, in addition to the third aspect, a height of the projecting part or a depth of the recess part is constant.

According to a fifth aspect of the present invention, in addition to any one of the first to fourth aspects, the projecting part or recess part is formed so as to have a triangular cross section having a ridge line in a direction orthogonal to the direction of entry of light.

According to a sixth aspect of the present invention, in addition to any one of the first to fifth aspects, the projecting parts or recess parts are grouped in the longitudinal direction, and the length of the projecting part or recess part is set to be constant among groups.

According to a seventh aspect of the present invention, in addition to the sixth aspect, the number of projecting parts or recess parts is set to be constant among the individual groups.

According to an eighth aspect of the present invention, there is provided a vehicle door comprising the vehicle illumination device according to any one of claims 1 to 7.

According to a ninth aspect of the present invention, there is provided a vehicle illumination device that includes a light source, a long light guide body that extends linearly in a direction of entry of light from one end thereof disposed so as to be adjacent to the light source and radiates light from a linear light-emitting face, and a long lens that is disposed in front of the light-emitting face and transmits the light radiated from the light-emitting face, wherein disposed on a surface of at least one of the light guide body and the lens is a contact body that forms a surface texture that suppresses vibration of the at least one of the light guide body and the lens when undergoing relative movement while making contact with the other thereof.

According to a tenth aspect, in addition to the arrangement of the ninth aspect, the contact body comprises asperities that are machined on the surface of at least one of the light guide body and the lens.

According to an eleventh aspect, in addition to the arrangement of the ninth or tenth aspect, a groove extending in the longitudinal direction and housing the light guide body is formed in the lens, and the contact body is disposed on an inner face of the groove.

According to a twelfth aspect, in addition to the arrangement of any one of the ninth to eleventh aspects, the contact body is disposed in the entirety of the contact area of the light guide body and the lens.

According to a thirteenth aspect, in addition to the arrangement of any one of the ninth to eleventh aspects, the contact body is disposed in part of the contact area of the light guide body and the lens.

According to a fourteenth aspect, in addition to the arrangement of any one of the ninth to thirteenth aspects, the contact body is disposed in an area of the lens that guides light outward from the light-emitting face of the light guide body and that is outside an incident face facing the light guide body.

According to a fifteenth aspect, in addition to the arrangement of the fourteenth aspect, the incident face is a plane.

According to a sixteenth aspect, there is provided a vehicle door that includes the arrangement of any one of the ninth to fifteenth aspects.

According to a seventeenth aspect of the present invention, there is provided a vehicle interior component that includes a rod-shaped light guide body extending linearly in a direction of entry of light from one end via which light is received and having a reflection face that refracts light transmitted in the direction of entry and reflects the light toward a linear light-emitting face extending in the direction of entry, a support body having a surface that guides movement of the light guide body in a specific direction orthogonal to the central axis of the light guide body, a first restriction piece formed on the support body and restricting movement of the light guide body guided in the specific direction, a second restriction piece that deforms elastically with respect to the support body from a first position in which the light guide body is pressed against the support body and the first restriction piece to a second position in which a gap is formed between itself and the support body, the gap allowing the light guide body moving in the specific direction along the surface of the support body to pass therethrough, and a fixing member that has higher stiffness than stiffness of the second restriction piece and retains the second restriction piece at the first position when being fixed relative to the support body.

According to an eighteenth aspect, in addition to the arrangement of the seventeenth aspect, a projecting piece is formed on one of the fixing member and the second restriction piece and is in contact with the other thereof.

According to a nineteenth aspect, in addition to the arrangement of the eighteenth aspect, a projecting piece that is in contact with the fixing member is formed on the second restriction piece.

According to a twentieth aspect, in addition to the arrangement of any one of the seventeenth to nineteenth aspects, the first restriction piece and the second restriction piece are disposed so as to be displaced in the linear direction of the light guide body.

According to a twenty-first aspect, in addition to the arrangement of any one of the seventeenth to twentieth aspects, the fixing member is a wall member that covers the light guide body, the first restriction piece and the second restriction piece while forming between itself and the support body a gap through which light of the light guide body shines, an inner face of the wall member being in contact with the second restriction piece.

According to a twenty-second aspect, in addition to the arrangement of any one of the seventeenth to twenty-first aspects, the light guide body has a semicolumnar body that is partitioned by a virtual plane defined between the light-emitting face and the reflection face in parallel to the reflection face and that is in contact with the support body and the second restriction piece.

According to a twenty-third aspect, in addition to the arrangement of any one of the seventeenth to twenty-second aspects, the fixing member and the second restriction piece are in contact with each other with a buffer material sandwiched therebetween.

According to a twenty-fourth aspect, there is provided a vehicle door provided with the arrangement of any one of the seventeenth to twenty-third aspects.

According to a twenty-fifth aspect of the present invention, there is provided a vehicle illumination device that includes a rod-shaped light guide body extending linearly in a direction of entry of light from one end via which light is received and having a reflection face that refracts light transmitted in the direction of entry and reflects the light toward a linear light-emitting face extending in the direction of entry, a fixing member having a main body facing the reflection face and extending linearly in parallel with the light guide body and fixing the light guide body to a vehicle interior member, the light guide body having a semicolumnar body that is partitioned by a virtual plane defined between the light-emitting face and the reflection face in parallel to the reflection face, a first curved face that is continuous from one end of a curved face of the semicolumnar body toward the reflection face in two first cross sections orthogonal to the central axis of the semicolumnar body and separated in an axial direction, and a second curved face that is continuous, toward the reflection face, from the other end of the curved face of the semicolumnar body in a second cross section disposed between the two first cross sections and orthogonal to the central axis, wherein the fixing member includes a first support body that extends from the main body while facing the first curved face in the first cross section, makes a first projection having a partially spherical surface that is in contact with the curved face of the semicolumnar body protrude, and has elasticity that pushes the first projection away from the curved face of the semicolumnar body in response to movement of the first curved face orthogonal to the virtual plane, and a second support body that extends from the main body while facing the second curved face in the second cross section, makes a second projection having a partially spherical surface that is in contact with the curved face of the semicolumnar body protrude, and has elasticity that pushes the second projection away from the curved face of the semicolumnar body in response to movement of the second curved face orthogonal to the virtual plane.

According to a twenty-sixth aspect, in addition to the arrangement of the twenty-fifth aspect, the fixing member has a third projection that protrudes from an inner face of the first support body and has a partially spherical surface that is in contact with the first curved face, and a fourth projection that protrudes from an inner face of the second support body and has a partially spherical surface that is in contact with the second curved face.

According to a twenty-seventh aspect, in addition to the arrangement of the twenty-fifth or twenty-sixth aspect, formed on the reflection face is a projecting part protruding outward from the reflection face and extending in a direction orthogonal to the direction of entry of the light, and formed on at least one of the first support body and the second support body is a rotation stop that makes contact with an end of the projecting part in the peripheral direction around the central axis.

According to a twenty-eighth aspect, in addition to the arrangement of any one of the twenty-fifth to twenty-seventh aspects, the second support body is disposed at a position that deviates from the first support body in the axial direction of the light guide body.

According to a twenty-ninth aspect, the vehicle door includes the vehicle illumination device according to any one of the twenty-fifth to twenty-eighth aspects.

Effects of the Invention

In accordance with the first aspect, since adjustment of the luminance of light radiated from the light-emitting face is achieved based on the length of the projecting part or the recess part, in the mold the length of a recess part or a projecting part may be changed according to the projecting part or recess part of the light guide body, and the mold can be machined more easily than in a case in which the height of the projecting part, the depth of the recess part, or the pitch of the projecting parts or the recess parts is changed in the mold. Since the projecting part or the recess part is established at the time of molding using a mold, the productivity of the light guide body is improved. As a result, the production cost is decreased.

In accordance with the second aspect, when the length of the projecting part or the recess part increases in a direction orthogonal to the direction of entry of light, the luminance of light radiated from the light-emitting face in response to refraction and diffused reflection is improved. It is therefore possible to ensure a sufficient luminance of light emission on the light-emitting face for light that is weakened due to being distant from the light source.

In accordance with the third aspect, since the luminance of light radiated from the light-emitting face is influenced by the pitch of the projecting parts or the recess parts, if the pitch of the projecting parts or the recess parts is set to be constant, it is possible to simplify the change in length of the projecting part or the recess part. The design of a mold can be simplified. The production cost of the mold can be reduced.

In accordance with the fourth aspect, in the mold a recess part having a constant depth may be formed so as to correspond to the projecting part of the light guide body, a projecting part having a constant height may be formed so as to correspond to the recess part, and design of the mold can be simplified. The production cost of the mold can be reduced.

In accordance with the fifth aspect, light can be diffused well.

In accordance with the sixth aspect, the graininess of light radiated from the light-emitting face can be suppressed.

In accordance with the seventh aspect, the graininess of light radiated from the light-emitting face can be suppressed.

In accordance with the eighth aspect, the production cost of the vehicle door can be reduced.

In accordance with the ninth aspect, even when the vehicle body vibrates and relative movement occurs between the light guide body and the lens in the planar direction, since frictional vibration between the light guide body and the lens is suppressed based on the surface texture of the at least one of the light guide body and the lens, the sound of rubbing between the light guide body and the lens can be suppressed (or eliminated).

In accordance with the tenth aspect, since asperities are merely formed on the surface of the light guide body and the lens when suppressing the sound of rubbing, it is unnecessary to mount a separate member exclusively used for the suppression of frictional vibration.

In accordance with the eleventh aspect, the light guide body can be fitted into the lens and can be retained by the lens. Support of the light guide body can be realized by virtue of the resilient force of the lens. Even when the light guide body thus continues to be in contact with the lens, the sound of rubbing between the light guide body and the lens can be suppressed (or eliminated).

In accordance with the twelfth aspect, since the contact body is disposed in the entire area of the contact region between the light guide body and the lens, the sound of rubbing between the light guide body and the lens can be suppressed (or eliminated) in the entire area of the contact region.

In accordance with the thirteenth aspect, since the contact body is disposed in part of the contact region between the light guide body and the lens, the frictional resistance can be appropriately adjusted in the contact region between the light guide body and the lens.

In accordance with the fourteenth aspect, light radiated from the light-emitting face can pass through the lens and escape without being inhibited by the contact body.

In accordance with the fifteenth aspect, since the incident face of the lens is defined by a plane, light reflected by the irradiation face via which light is radiated to the outside from the lens can be reflected by the incident face and emitted from the irradiation face. The light thus emitted from the irradiation face can be intensified.

In accordance with the sixteenth aspect, an effect of decorating the vehicle door by light can be achieved, and even if the vehicle body vibrates the occurrence of a sound unpleasant to the ear of an occupant within the vehicle compartment can be suppressed (or eliminated).

In accordance with the seventeenth aspect, when the second restriction piece is present at the second position in response to elastic deformation, a gap is ensured between the second restriction piece and the support body. The light guide body can move along the surface of the support body and pass through between the second restriction piece and the support body. Movement of the light guide body can be restricted by the first restriction piece. As a result, the second restriction piece is returned to the first position by virtue of elasticity. The second restriction piece presses the light guide body against the support body and the first restriction piece. Subsequently, when the fixing member is fixed, the fixing member restrains the second restriction piece to the first position. The second restriction piece therefore continues to press the light guide body against the support body and the first restriction piece. It is possible to prevent the light guide body from falling out. The light guide body can thus be fixed well onto the support body.

In accordance with the eighteenth aspect, due to the magnitude (height) of the projecting piece being adjusted, the pushing force transmitted to the second restriction piece can be adjusted. The light guide body can thus be fixed well onto the support body.

In accordance with the nineteenth aspect, due to the magnitude (height) of the projecting piece being adjusted, the pushing force transmitted to the second restriction piece can be adjusted. The light guide body can thus be fixed well onto the support body.

In accordance with the twentieth aspect, it is possible to utilize elastic deformation of the light guide body or the support body for displacement of the second restriction piece. The light guide body can therefore easily pass through between the second restriction piece and the support body.

In accordance with the twenty-first aspect, the support body and the wall member in combination give the vehicle interior component its appearance. The gap enables indirect lighting in which light of the light guide body leaks to be realized. Since the wall member also functions as a fixing member in this way, it is possible to avoid any increase in the number of components when restraining the second restriction piece.

In accordance with the twenty-second aspect, since the support body and the second restriction piece make contact with the semicolumnar body of the light guide body, it is possible to prevent the light guide body from falling out between the support body and the second restriction piece. The light guide body can be fixed well onto the support body.

In accordance with the twenty-third aspect, since the buffer material is sandwiched between the fixing member and the second restriction piece, it is possible to suppress the occurrence of an abnormal noise due to friction between the fixing member and the second restriction piece.

In accordance with the twenty-fourth aspect, in the vehicle door the light guide body can be fixed well onto the support body.

In accordance with the twenty-fifth aspect, the fixing member can provide three point support for at least the semicolumnar body of the light guide body by means of the two first projections and the second projection disposed between the first projections in the axial direction. Due to the three point support the light guide body can be retained on the fixing member so as to be parallel to the main body. When the light guide body moves in a direction orthogonal to the virtual plane and passes through a space sandwiched between the first projection and the second projection, the first curved face and the second curved face of the light guide body push and spread the first support body and the second support body. In this arrangement, the side face of the light guide body makes contact with the partially spherical surfaces of the first projection and the second projection; they do not make contact with the fixing member over the entire length, and the occurrence of scratches on an outer face of the light guide body can be suppressed. The transmission of light within the light guide body can be maintained well. Here, the two first support bodies may be connected to each other and be continuous.

In accordance with the twenty-sixth aspect, due to the first projection and the third projection making contact with the curved face of the semicolumnar body and the first curved face, movement of the light guide body orthogonal to the virtual plane can be restrained. Similarly, due to the second projection and the fourth projection making contact with the curved face of the semicolumnar body and the second curved face, movement of the light guide body orthogonal to the virtual plane can be restrained. It is thus possible to prevent the light guide body from rattling with respect to the fixing member.

In accordance with the twenty-seventh aspect, the rotation stop restrains rotational movement of the light guide body around the central axis of the light guide body. It is therefore possible to fix the position of the light-emitting face of the light guide body with respect to the fixing member around the central axis of the light guide body. It is possible to set the orientation of light with respect to the vehicle interior member.

In accordance with the twenty-eighth aspect, when the light guide body moves in a direction orthogonal to the virtual plane and passes through a space sandwiched between the first projection and the second projection, the first curved face and the second curved face of the light guide body push and spread the first support body and the second support body. In this arrangement, twisting of the main body can be utilized for displacement of the first projection and the second projection. The elasticity required for the first support body and the second support body can be suppressed. The stiffness of the fixing member can be enhanced.

In accordance with the twenty-ninth aspect, in the vehicle door the fixing member can provide three point support for at least the semicolumnar body of the light guide body by means of the two first projections and the second projection disposed between the first projections in the axial direction. Due to the three point support the light guide body can be retained on the fixing member so as to be parallel to the main body. When the light guide body moves in a direction orthogonal to the virtual plane and passes through a space sandwiched between the first projection and the second projection, the first curved face and the second curved face of the light guide body push and spread the first support body and the second support body. In this arrangement, the side face of the light guide body makes contact with the partially spherical surfaces of the first projection and the second projection; they do not make contact with the fixing member over the entire length, and the occurrence of scratches on an outer face of the light guide body can be suppressed. The transmission of light within the light guide body can be maintained well. Here, the two first support bodies may be connected to each other and be continuous.

BRIEF DESCRIPTION OF DRAWINGS

FIG. 19 is a sectional view, corresponding to FIG. 15(B), showing a cross section of an illumination device related to a modified example.

FIG. 24 is a sectional view, corresponding to FIG. 22, schematically showing the light guide body entering the fixing member.

EXPLANATION OF REFERENCE NUMERALS AND SYMBOLS

Figure 1:
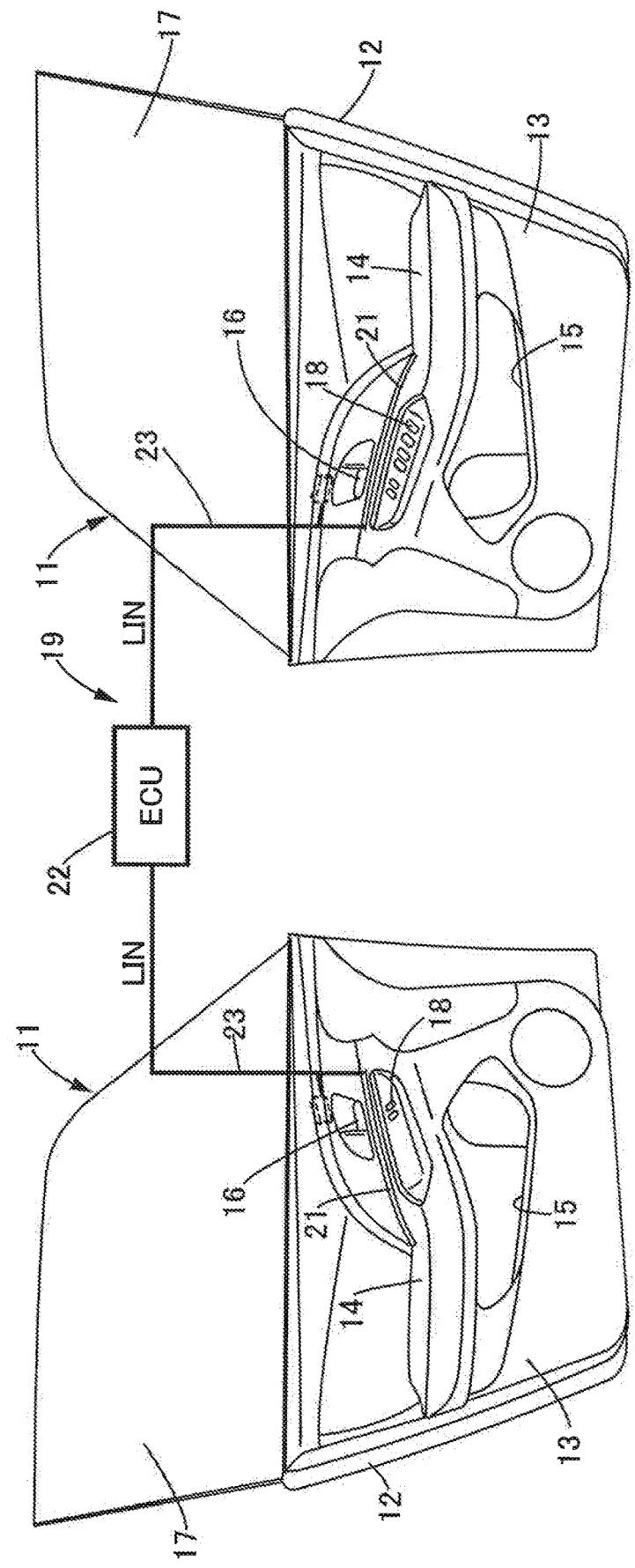
FIG. 1 is a conceptual diagram of a vehicle door related to a first embodiment of the present invention.

11 Vehicle door
21 Vehicle illumination device
24 Light source
25 Light guide body
32 Light-emitting face
34 Projecting part
34a Ridge line (of projecting part)
48 Recess part
Pitch (of projecting part or recess part)
W1 to W12 Width (of projecting part or recess part)

MODES FOR CARRYING OUT THE INVENTION

One embodiment of the present invention is explained below by reference to the attached drawings.

FIG. 1 schematically shows the arrangement of a vehicle door related to a first embodiment mounted in an automobile. A vehicle door 11 includes a door main body 12 hinged to a vehicle skeleton so that it can be opened and closed, and a door trim 13 affixed to the inside of the door main body 12. Formed on the door trim 13 are a door arm rest 14 supporting an arm of an occupant, and a door pocket 15 used for housing a small article beneath the door arm rest 14. Incorporated into the door trim 13 above the door arm rest 14 is a door inside handle 16 operated when opening and closing the vehicle door 11. Embedded in the door arm rest 14 are a switch 18 operated when opening and closing a window glass 17 and an illumination system 19 illuminating the door inside handle 16 or the switch 18 in a dark environment and also giving a decorative effect to the vehicle door 11.

The illumination system 19 includes an illumination device 21 that is embedded in each of the door arm rests 14 on the left and right and illuminates the edge of the door arm rest 14 when it is turned on. The illumination device 21 is connected to an automobile control unit (ECU) 22 via LIN communication. The control unit 22 controls the turning on and turning off of the illumination device 21. In accordance with LIN communication, the illumination device 21 may be connected to the control unit 22 in series or in parallel by means of one wire harness 23.

Figure 2:
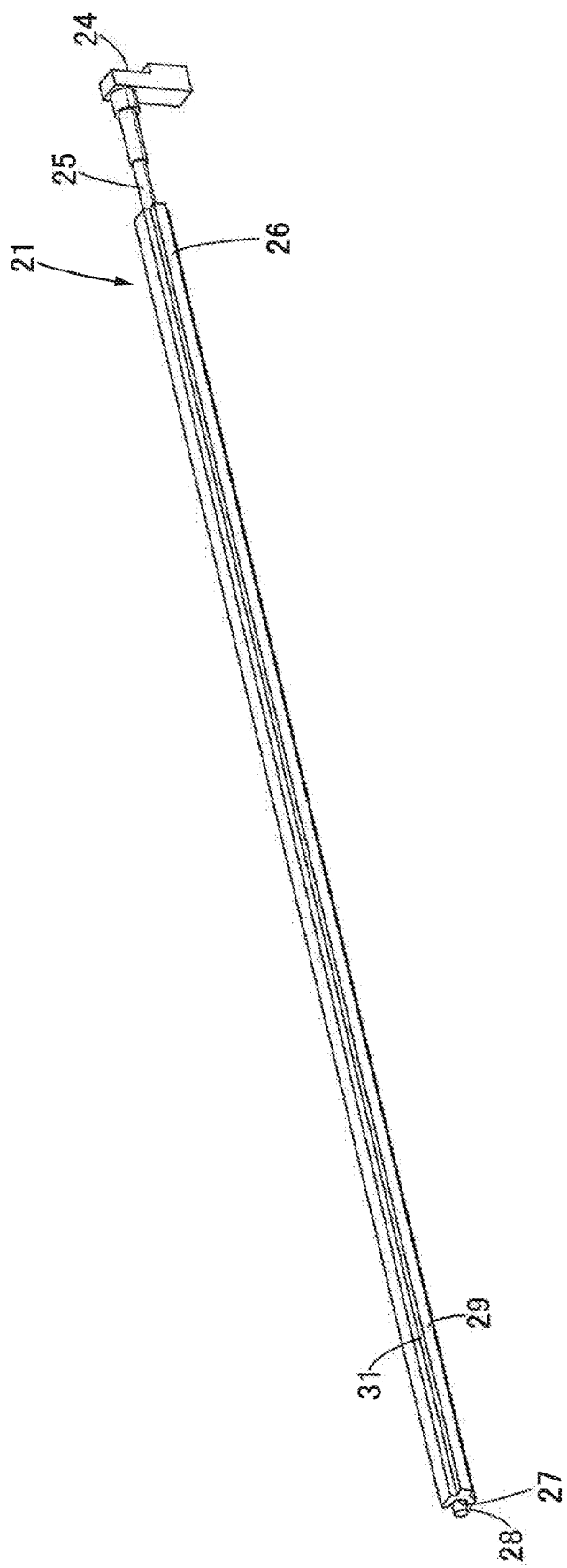
FIG. 2 is an enlarged perspective view of an illumination device.

As shown in FIG. 2, the illumination device 21 includes a light source 24, a long light guide body 25 extending linearly in the direction of entry of light from one end thereof disposed so as to be adjacent to the light source 24, and a long lens 26 covering the light guide body 25 and transmitting light radiated from the light guide body 25. The light source 24 emits light in the linear direction of the light guide body 25 from a light-emitting body in response to the supply of electric power. The light source 24 is connected to one end of the light guide body 25. The light guide body 25 guides light radiated from the light source 24 linearly in the linear direction (the longitudinal direction). Light escapes from an outer peripheral face of the light guide body 25. The light guide body 25 is molded from a transparent resin material such as for example a methacrylic resin.

The lens 26 includes a main body 28 that extends in the longitudinal direction and forms a groove 27 housing the light guide body 25, and a long protruding piece 31 that protrudes from the main body 28 outward as a trapezoidal shape so as to correspond to the deepest part of the groove 27 and has an irradiation face 29 formed as a plane extending in parallel to the light guide body 25. The protruding piece 31 is inserted into a gap of the door trim 13 and has the irradiation face 29 facing a vehicle compartment. The lens 26 guides light escaping from the outer peripheral face of the light guide body 25 to the irradiation face 29, and emits light from the irradiation face 29 toward the interior of the vehicle compartment. The lens 26 is molded from a transparent resin material such as for example a methacrylic resin.

Figure 3:
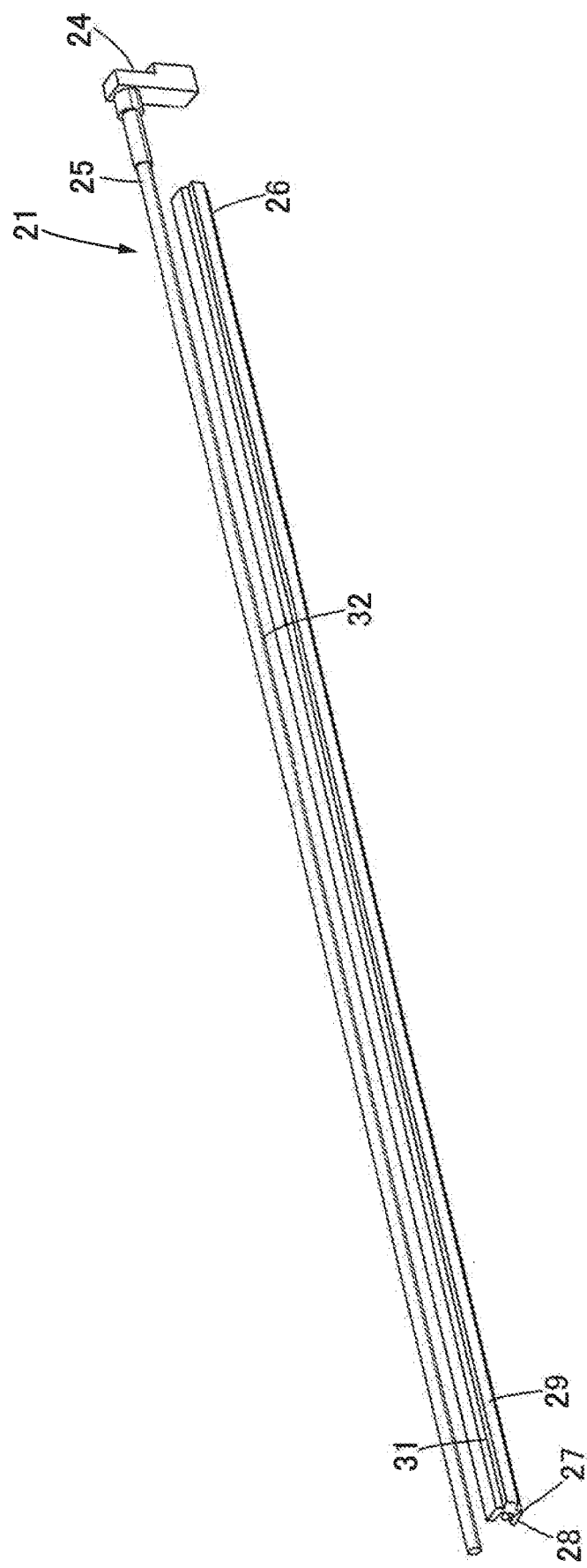
FIG. 3 is an enlarged exploded view of the illumination device.

As shown in FIG. 3, the light guide body 25 radiates light via a linear light-emitting face 32 formed from a cylindrical face having a linear central axis. The lens 26 is disposed in front of the light-emitting face 32. Light radiated from the light-emitting face 32 passes through the lens 26 and is emitted from the irradiation face 29.

Figure 4:
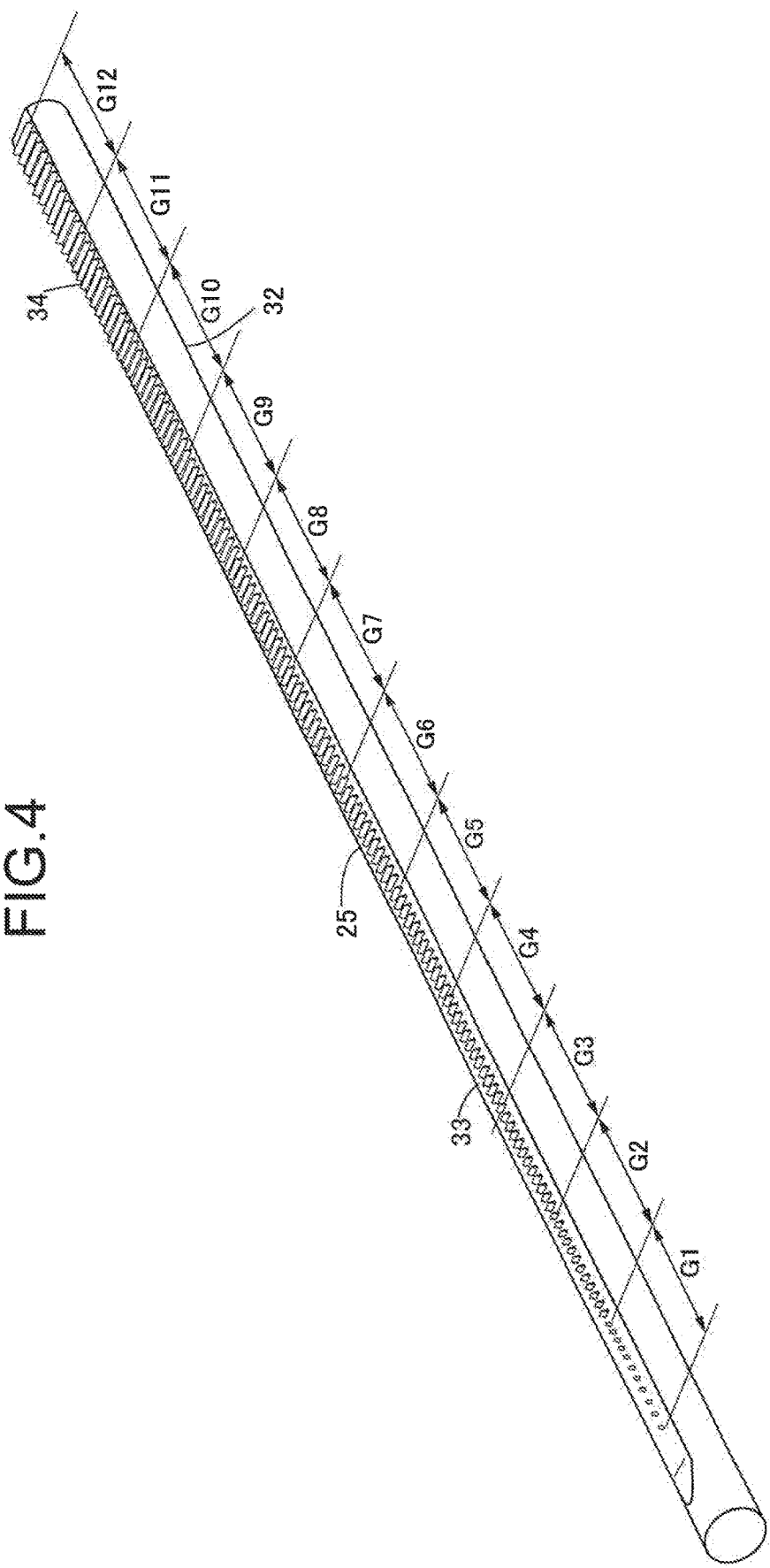
FIG. 4 is an enlarged perspective view of a light guide body.
Figure 5:
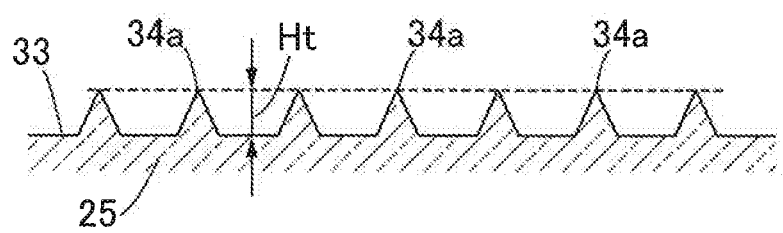
FIG. 5 is an enlarged sectional view of a projecting part on the light guide body.

As shown in FIG. 4, a plane 33 is defined on a back face of the light-emitting face 32, the plane 33 being disposed in parallel with the irradiation face 29 of the lens 26. The plane 33 describes a chord in a cross section orthogonal to the central axis. The width of the plane 33 (length of chord) is constant in the linear direction. Formed on the plane 33 are projecting parts 34 arranged in the longitudinal direction of the light guide body 25 and extending in a direction orthogonal to the direction of entry of light. The projecting parts 34 are arranged with a constant pitch P through the entire region in the longitudinal direction. As shown in FIG. 5, the projecting part 34 is formed into a triangular cross section having a ridge line 34*a* in a direction orthogonal to the direction of entry of light (linear direction of the light guide body 25). The ridge line may be formed as a curved face by chamfering. The height Ht of the projecting parts 34 is constant for all of the projecting parts 34.

Figure 6:
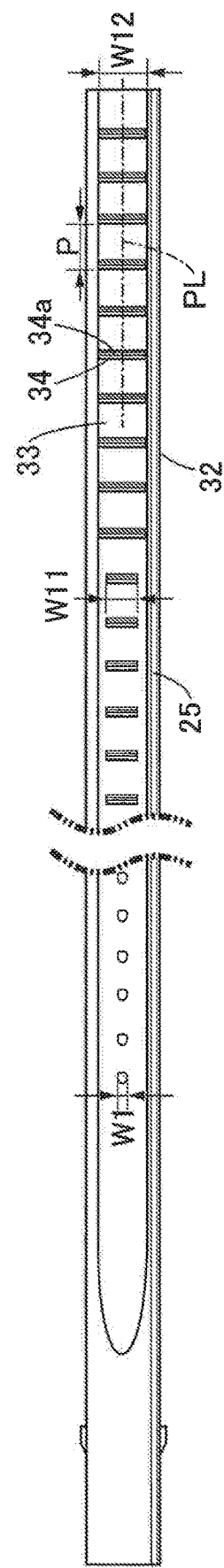
FIG. 6 is an enlarged plan view of the projecting part.

The length of the projecting part 34 in a direction orthogonal to the direction of entry of light (in the linear direction) increases in going away from the light source 24. Here, the projecting parts 34 are grouped in the longitudinal direction, and as shown in FIG. 6 lengths (widths) W1, W2 of the projecting parts 34 are set to be constant among groups G1 to G12. The number of projecting parts 34 is set to be constant among the individual groups G1 to G12. The individual projecting parts 34 are formed into a symmetrical shape with respect to a plane of symmetry LR containing the central axis of the light guide body 25.

The operation of the present embodiment is now explained. When the light source 24 emits light, the light advances within the light guide body 25 in the linear direction (in the longitudinal direction) of the light guide body 25. The light is diffusely reflected by the projecting parts 34 on the back face of the light-emitting face 32 and refracted to an orientation orthogonal to the linear direction. The refracted light is radiated forward from the light-emitting face 32. The radiated light passes through the lens 26 and is emitted into the interior of the vehicle compartment via the irradiation face 29. The edge of the door arm rest 14 is thus illuminated with a linear shape.

In this arrangement, adjustment of the luminance of light radiated from the light-emitting face 32 is achieved based on the width of the projecting part 34. That is, when the width of the projecting part 34 in a direction orthogonal to the direction of entry of light increases, the luminance of light radiated from the light-emitting face 32 due to refraction and diffused reflection is improved. Therefore, as described later, in the mold the width of a recess part may be changed according to the projecting part 34 of the light guide body 25, and the mold can be machined more easily than in a case in which the height of the projecting part 34 or the pitch P of the projecting parts 34 is changed in the mold. Since the projecting part 34 is established at the time of molding using a mold, the productivity of the light guide body 25 is improved. As a result, the cost of production of the illumination device 21 can be reduced. Consequently, the cost of production of a vehicle door can be reduced.

In the present embodiment, the width of the projecting part 34 increases in going away from the light source 24. Although the luminance of light decreases according to the distance from the light source 24, the width of the projecting part 34 increases according to the distance from the light source 24, and the amount of light refracted increases. It is possible to ensure a sufficient luminance of light emission on the light-emitting face 32 despite the light being weakened in going away from the light source 24. A constant luminance is achieved in the linear direction. Here, the projecting parts 34 are grouped in the longitudinal direction, and the width of the projecting parts 34 is set to be constant among the groups G1 to G12. As a result, the graininess of light radiated from the light-emitting face 32 can be suppressed. Moreover, since the number of projecting parts 34 is set to be constant among the individual groups G1 to G12, the graininess of light radiated from the light-emitting face 32 can be further suppressed.

In the illumination device 21 related to the present embodiment, the projecting parts 34 are arranged with the constant pitch P in the longitudinal direction. Since the luminance of light radiated from the light-emitting face 32 is influenced by the pitch P of the projecting parts 34, when the pitch P of the projecting parts 34 is set to be constant, the change in width of the projecting parts 34 can be simplified. The design of a mold can be simplified. The cost of production of the mold can be reduced.

The height of the projecting parts 34 is constant. In the mold, a recess part having a constant depth may be formed so as to correspond to the projecting part 34 of the light guide body 25, and the design of the mold can be simplified. The cost of production of the mold can be reduced.

The projecting part 34 is formed so as to have a triangular cross section having the ridge line 34*a* in a direction orthogonal to the direction of entry of light. Light can be diffused well.

Figure 7:
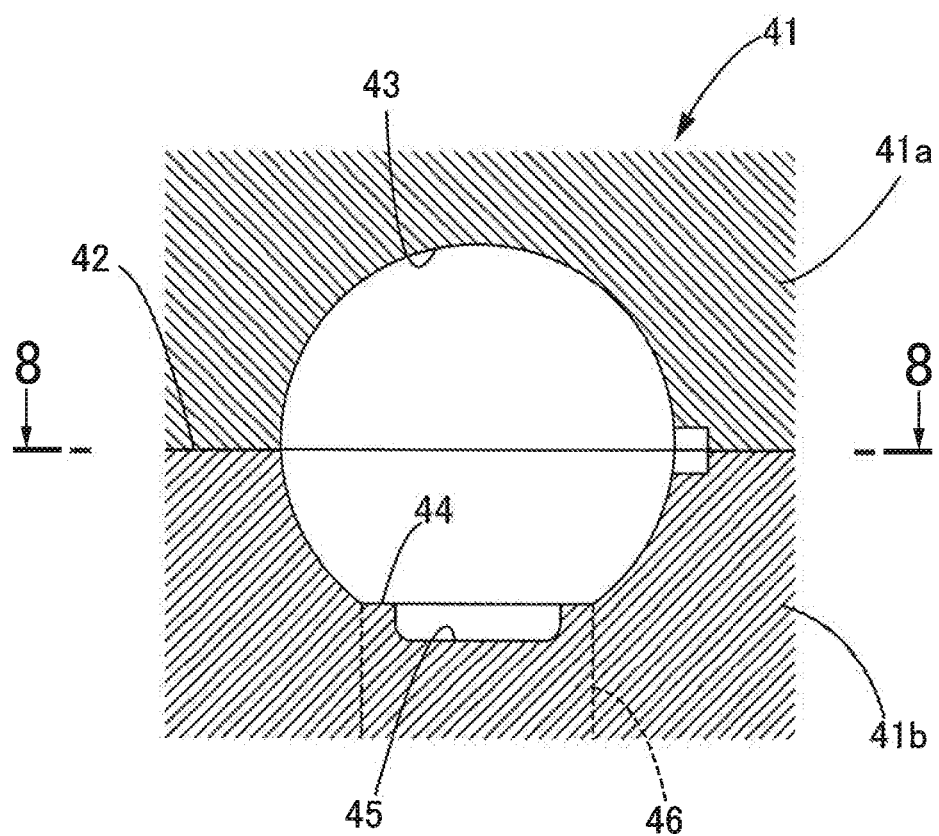
FIG. 7 is an enlarged sectional view of a mold used when molding the light guide body.
Figure 8:
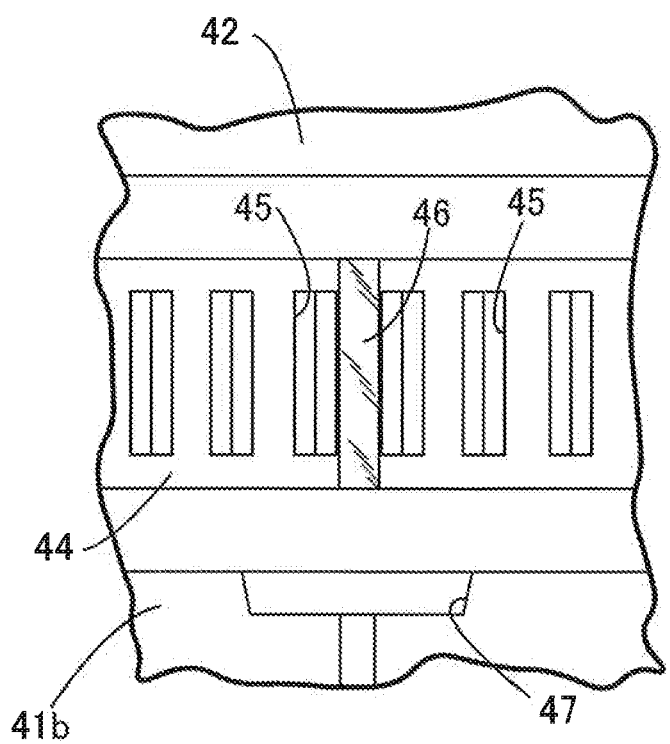
FIG. 8 is an enlarged partial plan view of a lower die.

A method for manufacturing the light guide body 25 is now explained. As shown in FIG. 7, a mold 41 is prepared. The mold 41 includes an upper die 41*a* and a lower die 41*b* that are joined to each other via a planar joining face 42. When the upper die 41*a* is superimposed on the lower die 41*b*, a cavity 43 is defined between the upper die 41*a* and the lower die 41*b*. The cavity 43 corresponds to a space representing the shape of the light guide body 25. The joining face 42 is positioned at the maximum diameter of the cylindrical face.

A plane 44 is formed on the lower die 41b so as to be in parallel with the joining face 42 at a position that is furthest from the joining face 42 so as to correspond to the plane 33 of the light guide body 25. Depressions 45 are arranged on the plane 44 in the linear direction so as to correspond to the individual projecting parts 34. Each depression 45 extends in a direction orthogonal to the linear direction. The depressions 45 are arranged with the constant pitch P through the entire region in the linear direction. The depression 45 is formed so as to have a triangular cross section having a ridge line extending in a direction orthogonal to the linear direction. The depth of the depressions 45 is constant for all of the depressions 45. The depressions 45 are grouped in the linear direction, and the widths W1 to W12 of the depressions 45 are constant among groups G1 to G12. The number of depressions 45 is constant among the individual groups G1 to G12. The individual depressions 45 are formed into a symmetrical shape with respect to a plane of symmetry LR containing the central axis of the cylindrical face.

An eject pin 46 faces the cavity 43 between the depressions 45. A gate 47 is formed in the cavity 43 at a middle position in the longitudinal direction. A molten resin is supplied from the gate 47 to the cavity 43. When the resin with which the cavity 43 is charged is solidified, a molding is formed. The molding is released from the lower die 41b owing to the function of the eject pin 46. A resin body of the gate 47 is cut away from the molding.

Figure 9:
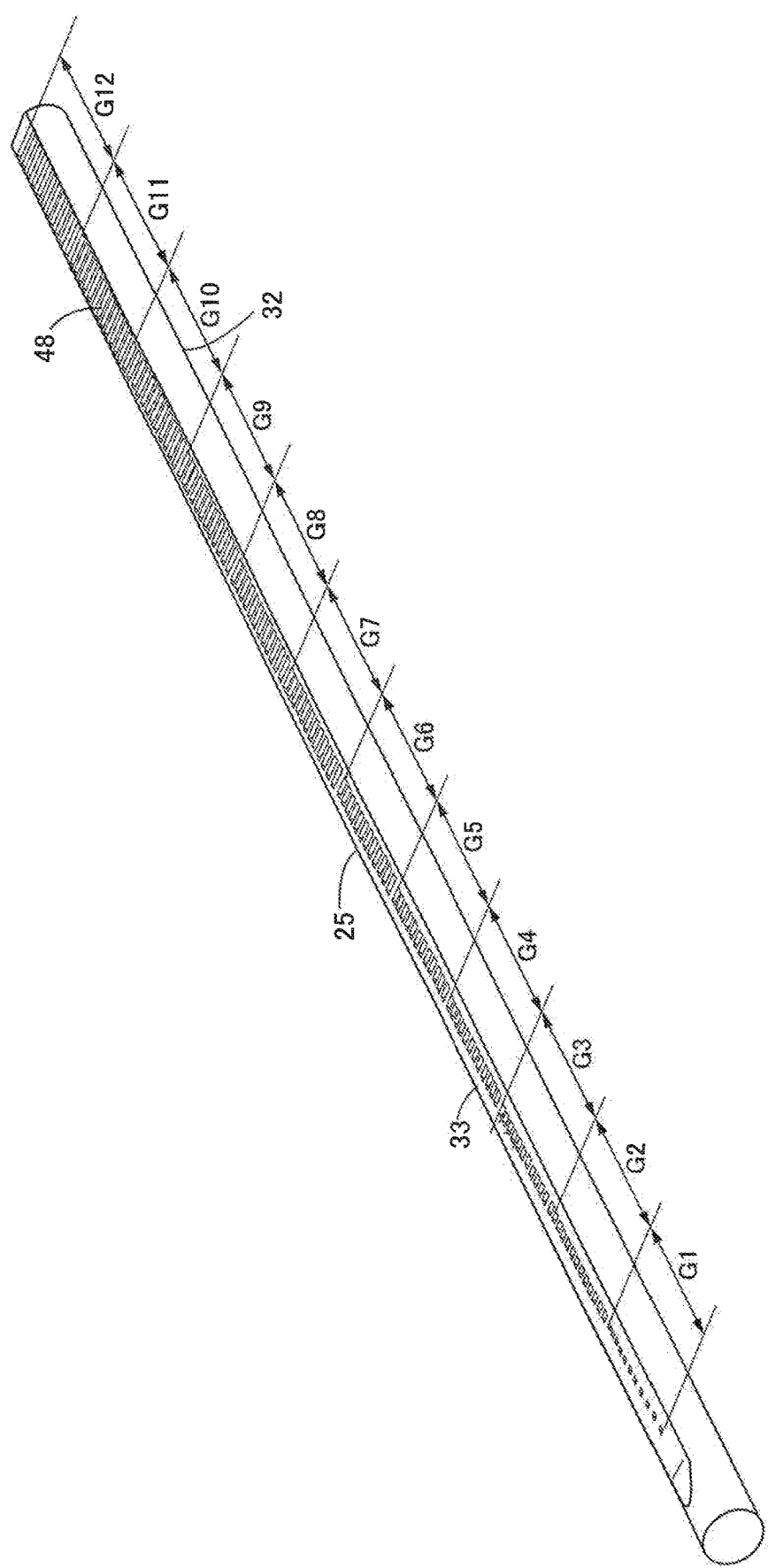
FIG. 9 is an enlarged perspective view of a light guide body related to a second embodiment of the present invention.

FIG. 9 schematically shows a light guide body 25 related to a second embodiment of the present invention. In the light guide body 25, instead of the projecting part 34 described above, a recess part 48 is formed in the plane 33. The recess part 48 extends in a direction orthogonal to the direction of entry of light as for the projecting part 34. The recess parts 48 are arranged with a constant pitch P through the entire region in the longitudinal direction. The recess part 48 is formed so as to have a triangular cross section having a ridge line in a direction orthogonal to the direction of entry of light (the linear direction of the light guide body 25). The ridge line may be chamfered so as to have a curved face. The depth of the recess part 48 is constant for all of the recess parts 48.

The width of the recess part 48 increases in going away from the light source 24. Here, the recess parts 48 are grouped in the longitudinal direction, and widths W1, W2 of the recess parts 48 are set to be constant among groups G1 to G12. The number of recess parts 48 is set to be constant among the individual groups G1 to G12. The individual recess parts 48 are formed into a symmetrical shape with respect to a plane of symmetry LR containing the central axis of the light guide body 25.

Figure 10:
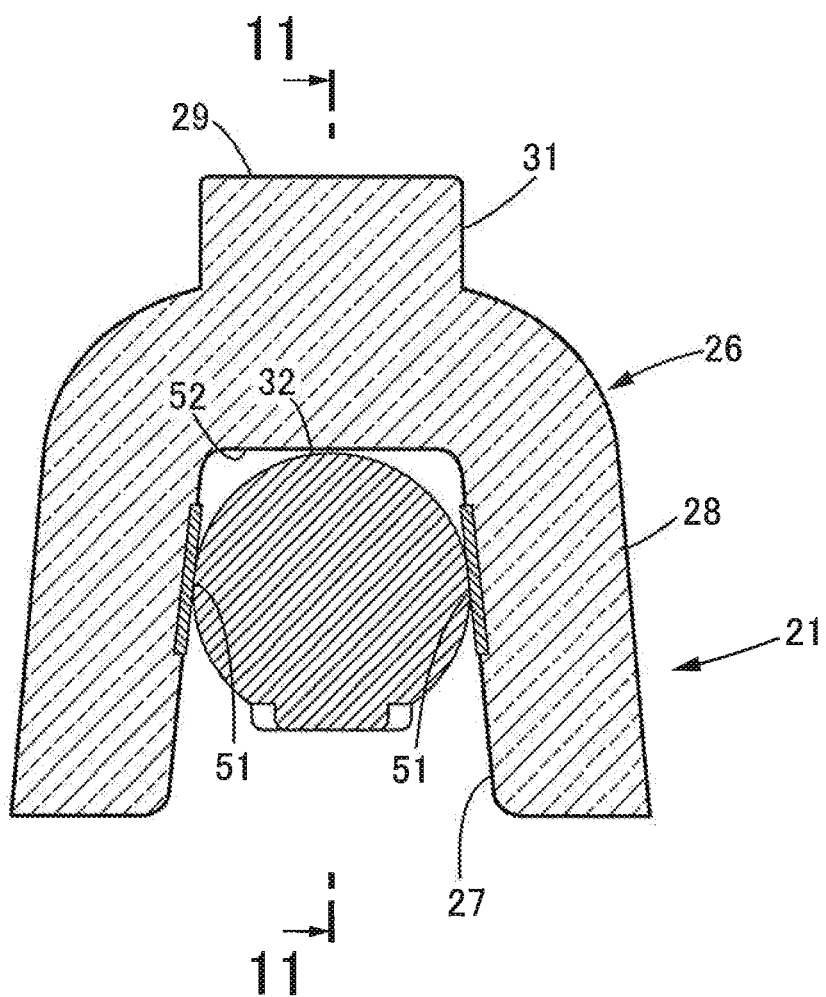
FIG. 10 is a sectional view when viewed in a cross section orthogonal to the axis of a lens and a light guide body.

FIG. 10 schematically shows a lens 26 related to a third embodiment of the present invention. A contact body 51 is disposed on the surface of the lens 26, the contact body 51 forming a surface texture that suppresses the vibration of at least one of the light guide body 25 and the lens 26 when undergoing relative movement while being in contact with the light guide body 25. The contact body 51 comprises asperities formed by machining the surface of the lens 26. When forming the asperities, the lens 26 is subjected to for example texturing.

Figure 11:
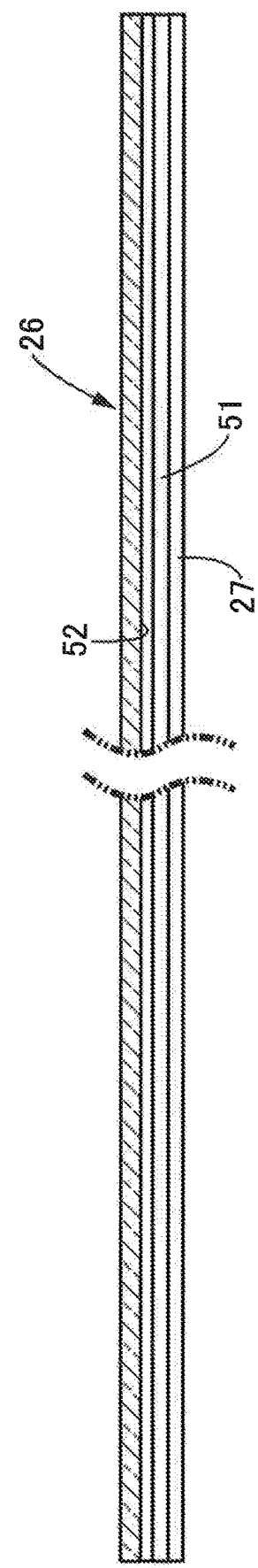
FIG. 11 is a sectional view schematically showing an inner face of the lens.

The contact body 51 is disposed on an inner face of the groove 27. The contact body 51 is disposed in a region in which light is guided outward from the light-emitting face 32 of the light guide body 25 by means of the lens 26 and which is outside an incident face 52 facing the light guide body 25. The contact body 51 is disposed outside a space sandwiched between the irradiation face 29 and the plane 33 of the light guide body 25. The incident face 52 of the lens 26 is a plane. As shown in FIG. 11, the contact body 51 is disposed in the entire area of the contact region between the light guide body 25 and the lens 26. Here, the contact body 51 may be continuous at least over the entire length of the contact region in the longitudinal direction of the light guide body 25.

The operation of the present embodiment is now explained. When the light source 24 emits light, the light advances within the light guide body 25 in the linear direction (the longitudinal direction) of the light guide body 25. The light is diffusely reflected by the projecting part 34 on the back face of the light-emitting face 32 and refracted in an orientation orthogonal to the linear direction. The refracted light is radiated forward from the light-emitting face 32. The light thus radiated passes through the lens 26 and is emitted to the interior of a vehicle compartment via the irradiation face 29. The edge of the door arm rest 14 is thus illuminated with a linear shape.

The width of the projecting part 34 increases in going away from the light source. Although the luminance of light decreases according to the distance from the light source 24, the width of the projecting part 34 increases according to the distance from the light source 24 and the amount of light refracted increases. It is possible to ensure sufficient luminance of the light emitted from the light-emitting face 32 despite the light distant from the light source 24 being weakened. A constant luminance is achieved in the linear direction.

In the present embodiment, the contact body 51 is disposed on the surface of at least one of the light guide body 25 and the lens 26 (here, on the surface of the lens 26), the contact body 51 forming a surface texture that suppresses the vibration of at least one of the light guide body 25 and the lens 26 when undergoing relative movement while being in contact with the other thereof. Even when the vehicle body vibrates and relative movement occurs between the light guide body 25 and the lens 26 in the planar direction, since frictional vibration between the light guide body 25 and the lens 26 is suppressed based on the surface texture of at least one of the light guide body 25 and the lens 26, the sound of rubbing between the light guide body 25 and the lens 26 is suppressed (or eliminated). An effect of decorating the vehicle door 11 with light is achieved, and even when the vehicle body vibrates, the occurrence of an unpleasant sound to an occupant within the vehicle compartment can be suppressed (or eliminated).

The contact body 51 comprises asperities formed by machining the surface of at least one of the light guide body 25 and the lens 26 (here, the lens 26). Therefore, since asperities are merely formed on the surface of the light guide body 25 and the lens 26 for suppressing the rubbing sound, it is unnecessary to employ a separate member exclusively used for suppressing frictional vibration. When asperities are formed by texturing at the time of molding the lens 26, any increase in the operating steps when assembling the illumination device 21 can be avoided. Any increase in the production cost can be avoided.

The contact body 51 is formed on an inner face of the groove 27 formed in the lens 26 and housing the light guide body 25. The light guide body 25 is fitted into the lens 26 and retained by the lens 26. The light guide body 25 is supported by virtue of the resilient force of the lens 26. Even when the light guide body 25 continues to be in contact with the lens 26, the sound of rubbing between the light guide body 25 and the lens 26 can be suppressed (or eliminated).

The contact body 51 is disposed in the entire area of the contact region between the light guide body 25 and the lens 26. Since the contact body 51 is disposed through the entire area of the contact region between the light guide body 25 and the lens 26, the sound of rubbing between the light guide body 25 and the lens 26 can be suppressed (or eliminated) through the entire area of the contact region.

The contact body 51 is disposed in a region in which light is guided outward from the light-emitting face 32 of the light guide body 25 by means of the lens 26 and which is outside the incident face 52 facing the light guide body 25. The light radiated from the light-emitting face 32 is not inhibited by the contact body 51, passes through the lens 26, and escapes to the outside.

In the present embodiment, the incident face 52 of the lens 26 is a plane. Since the incident face 52 of the lens 26 is defined by a plane, light reflected by the irradiation face 29, which radiates light outward from the lens 26, is reflected by the incident face 52 and emitted via the irradiation face 29. In this way, light emitted via the irradiation face 29 is intensified.

Figure 12:
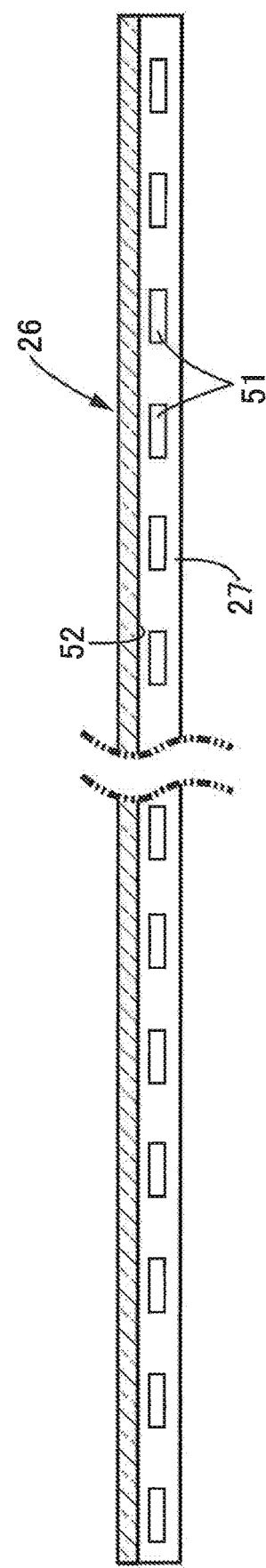
FIG. 12 is a sectional view schematically showing an inner face of a lens having a contact body related to one modified example.

As shown in FIG. 12, the contact body 51 may be disposed in part of the contact region between the light guide body 25 and the lens 26. The contact body 51 may be disposed discontinuously over the entire length of the contact region in the longitudinal direction of the light guide body 25.

Figure 13:
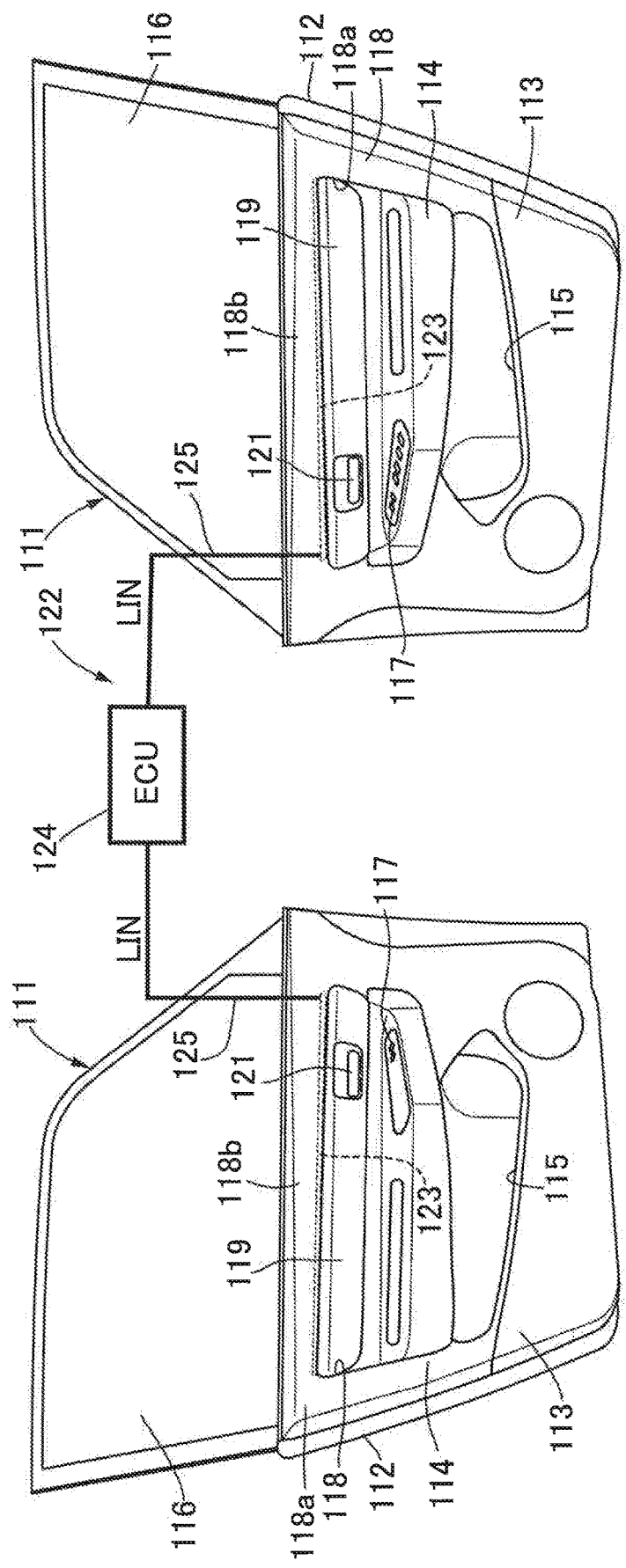
FIG. 13 is a conceptual diagram of a vehicle door.

FIG. 13 schematically shows the arrangement of a vehicle door mounted on an automobile. A vehicle door 111 includes a door main body 112 hinged to a skeleton of a vehicle so that it can be opened and closed, and a door trim (interior component) 113 affixed to the inside of the door main body 112. Formed on the door trim 113 are a door arm rest 114 supporting an occupant's arm, and a door pocket 115 utilized for housing a small article beneath the door arm rest 114. Embedded in the door arm rest 114 is a switch 117 operated when opening and closing a window glass 116.

The door trim 113 includes a door lining 118 lining the door main body 112 and defining an opening 118a above the door arm rest 114, and a decorative cover 119 disposed within the opening 118a of the door lining 118 and fixed to the door main body 112. Incorporated into the decorative cover 119 is a door inside handle 121 operated when opening and closing the vehicle door 111.

Embedded in the door trim 113 is an illumination system 122 that illuminates the door inside handle 121 or the switch 117 in a dark environment and also exhibits an effect of decorating the vehicle door 111. The illumination system 122 includes an illumination device 123 that illuminates the decorative cover 119 as a linear shape along the lower edge of an upper door lining 118b. The illumination device 123 forms light that escapes from a gap defined between the lower edge of the upper door lining 118b and the decorative cover 119. The illumination device 123 is connected to an automobile electronic control unit (ECU) 124 via LIN communication. The electronic control unit 124 controls the turning on and turning off of the illumination device 123. In accordance with LIN communication, the illumination device 123 may be connected to the electronic control unit 124 in series or in parallel by means of one wire harness 125.

Figure 14:
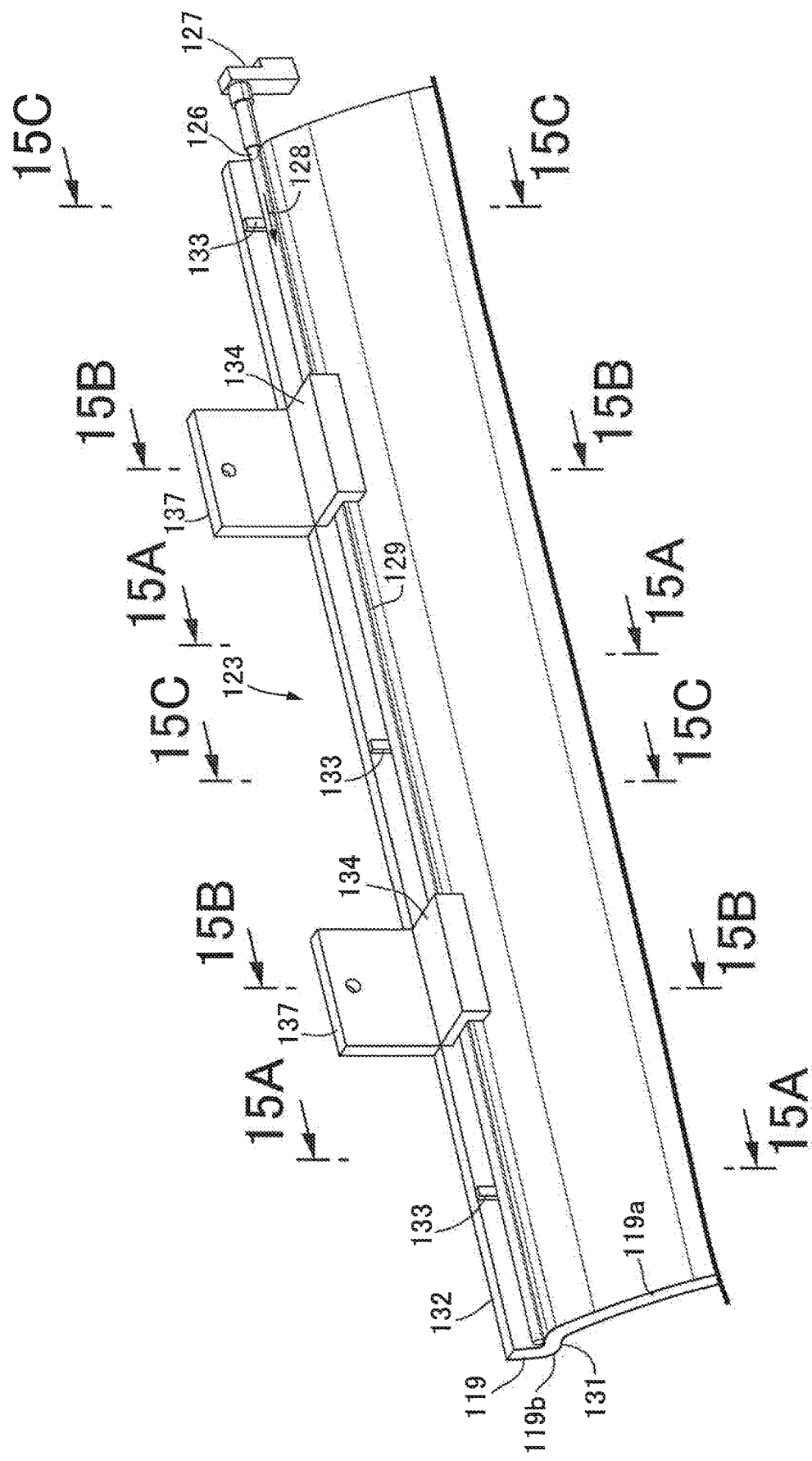
FIG. 14 is an enlarged perspective view schematically showing the structure of an illumination device related to a third embodiment.

As shown in FIG. 14, the illumination device 123 related to the third embodiment includes a rod-shaped light guide body 126 and a light source 127 that is connected to one end of the light guide body 126. The light guide body 126 extends linearly in the direction of entry of light 128 from the one end connected to the light source 127. The light source 127 emits light in the linear direction of the light guide body 126 from a light-emitting body in response to the supply of electric power. The light guide body 126 radiates light from a linear light-emitting face 129 formed into a cylindrical face having a linear central axis.

The light guide body 126 is supported on the decorative cover 119. The decorative cover 119 includes an inner panel 119a that is exposed to a compartment while surrounding the door inside handle 121 and has an upper end extending in the horizontal direction along the lower edge of the upper door lining 118b, and a linear support body 119b that is continuous from the upper end of the inner panel 119a and extends in parallel with the light guide body 126. The support body 119b has a horizontal wall 131 that is curved from the upper end of the inner panel 119a and spreads toward the door main body 112, and a vertical wall 132 that rises upward from the inner end of the horizontal wall 131 facing the door main body 112. The surface of the horizontal wall 131 guides movement of the light guide body 126 in a specific direction orthogonal to the central axis of the light guide body 126 from the upper end of the inner panel 119a toward the vertical wall 132.

Figure 15:
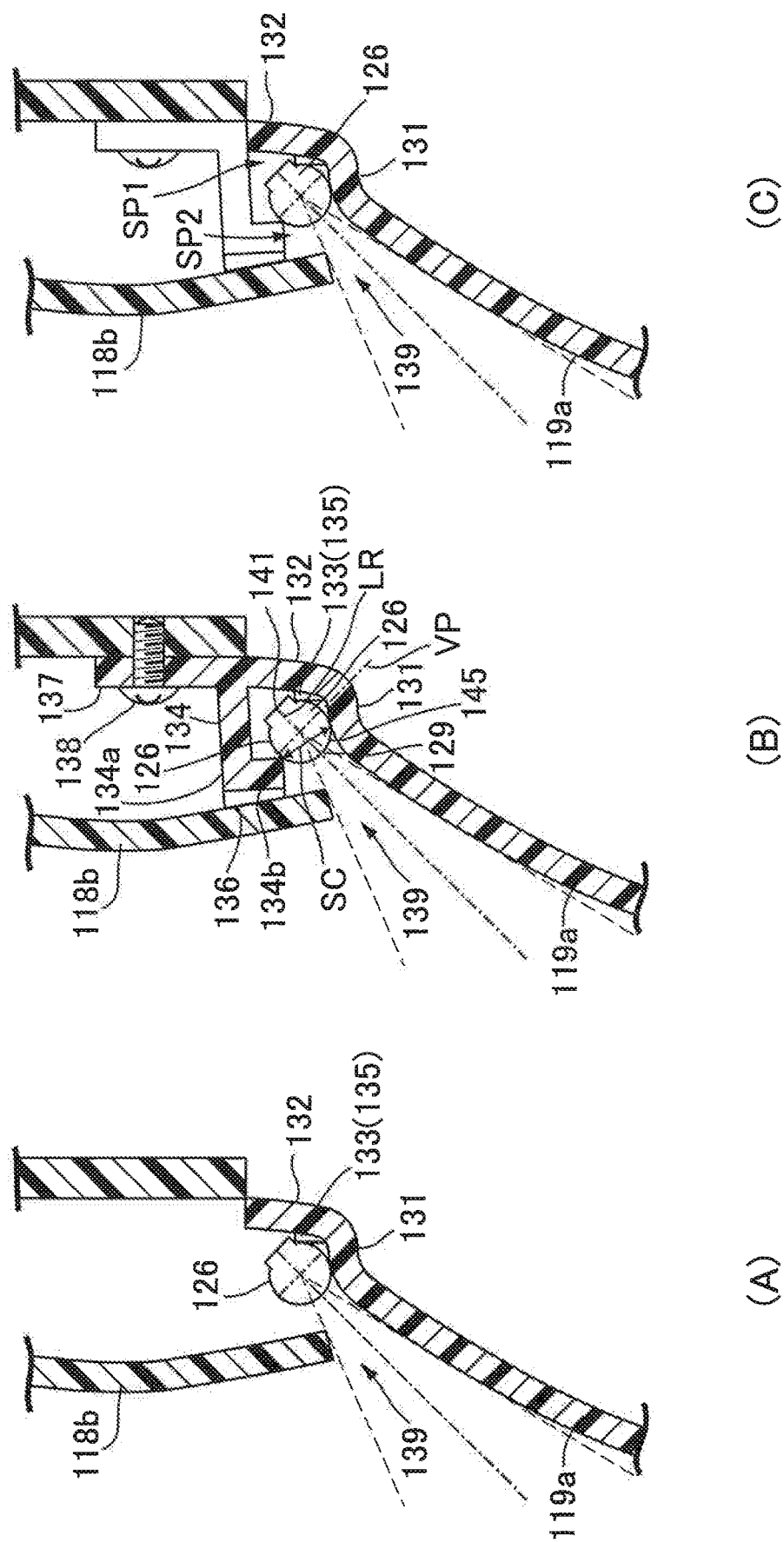
FIG. 15(A) is a sectional view along line 15A-15A in FIG. 14.
FIG. 15(B) is a sectional view along line 15B-15B in FIG. 14.
FIG. 15(C) is a sectional view along line 15C-15C in FIG. 14.

A first restriction piece 133 and a second restriction piece 134 are alternatingly disposed on the vertical wall 132 in the linear direction of the light guide body 126. The first restriction piece 133 and the second restriction piece 134 are disposed so as to be displaced in the linear direction of the light guide body 126. Here, the second restriction piece 134 is positioned at an intermediate position between the first restriction pieces 133. The first restriction piece 133 may be disposed at an intermediate position between the second restriction pieces 134. As shown in FIG. 15(A), the first restriction piece 133 includes a rib 135 that protrudes from an inner face of the vertical wall 132 and limits movement of the light guide body 126 guided toward the vertical wall 132 along the surface of the horizontal wall 131.

As shown in FIG. 15(B), the second restriction piece 134 has a plate piece 134a that is continuous from the upper end of the vertical wall 132 and is made to face the horizontal wall 131, and a latching piece 134b that is continuous from the open end of the plate piece 134a and extends toward the horizontal wall 131. The latching piece 134b is displaced relative to the support body 119b based on elastic deformation of the plate piece 134a.

Formed on the second restriction piece 134 is a projecting piece 136 that is in contact with an inner face of the upper door lining 118b. The upper door lining 118b includes a wall member that has higher stiffness than that of the second restriction piece 134 and makes contact with the second restriction piece 134 via an inner face. The upper door lining 118b restrains the latching piece 134b of the second restriction piece 134 to a first position in which the light guide body 126 is pressed against the horizontal wall 131 of the support body 119b and the first restriction piece 133.

Formed on the second restriction piece 134 is a bracket 137 that is continuous from the vertical wall 132 and extends upward. The bracket 137 is superimposed on an inner face of the door main body 112 and fixed to the door main body 112 by means of a screw 138.

As shown in FIGS. 15(A), (B), and (C), the upper door lining 118b covers the light guide body 126, the first restriction piece 133, and the second restriction piece 134 while forming between itself and the support body 119b a gap 139 via which the light of the light guide body 126 leaks. As shown in FIG. 15(C), the light guide body 126 is received by the horizontal wall 131 at a position that deviates from the first restriction piece 133 and the second restriction piece 134 in the linear direction of the light guide body 126, an empty space SP1 is ensured between the light guide body 126 and the vertical wall 132, and an empty space is ensured between the light guide body 126 and the upper door lining 118b.

Figure 16:
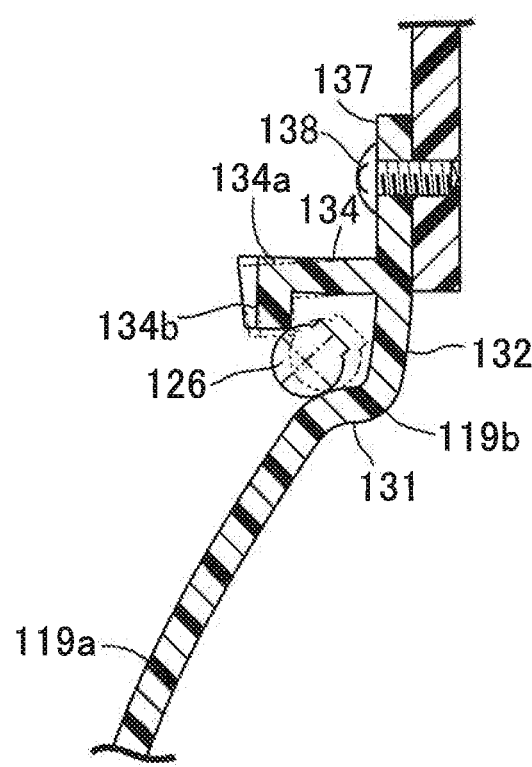
FIG. 16 is a sectional view, corresponding to FIG. 15(B), showing a cross section of an illumination device when an upper door lining is detached.

As shown in FIG. 16, the second restriction piece 134 can be displaced to a second position in which it is further away from the support body 119b than in the first position when the second restriction piece 134 is released from the restraint by the upper door lining 118b. A gap is formed between the support body 119b and the latching piece 134b at the second position, the gap allowing the light guide body 126 moving toward the vertical wall 132 along the surface of the horizontal wall 131 to pass therethrough. The light guide body 126 can move back and forth along the surface of the support body 119b in response to elastic deformation of the second restriction piece 134.

Figure 17:
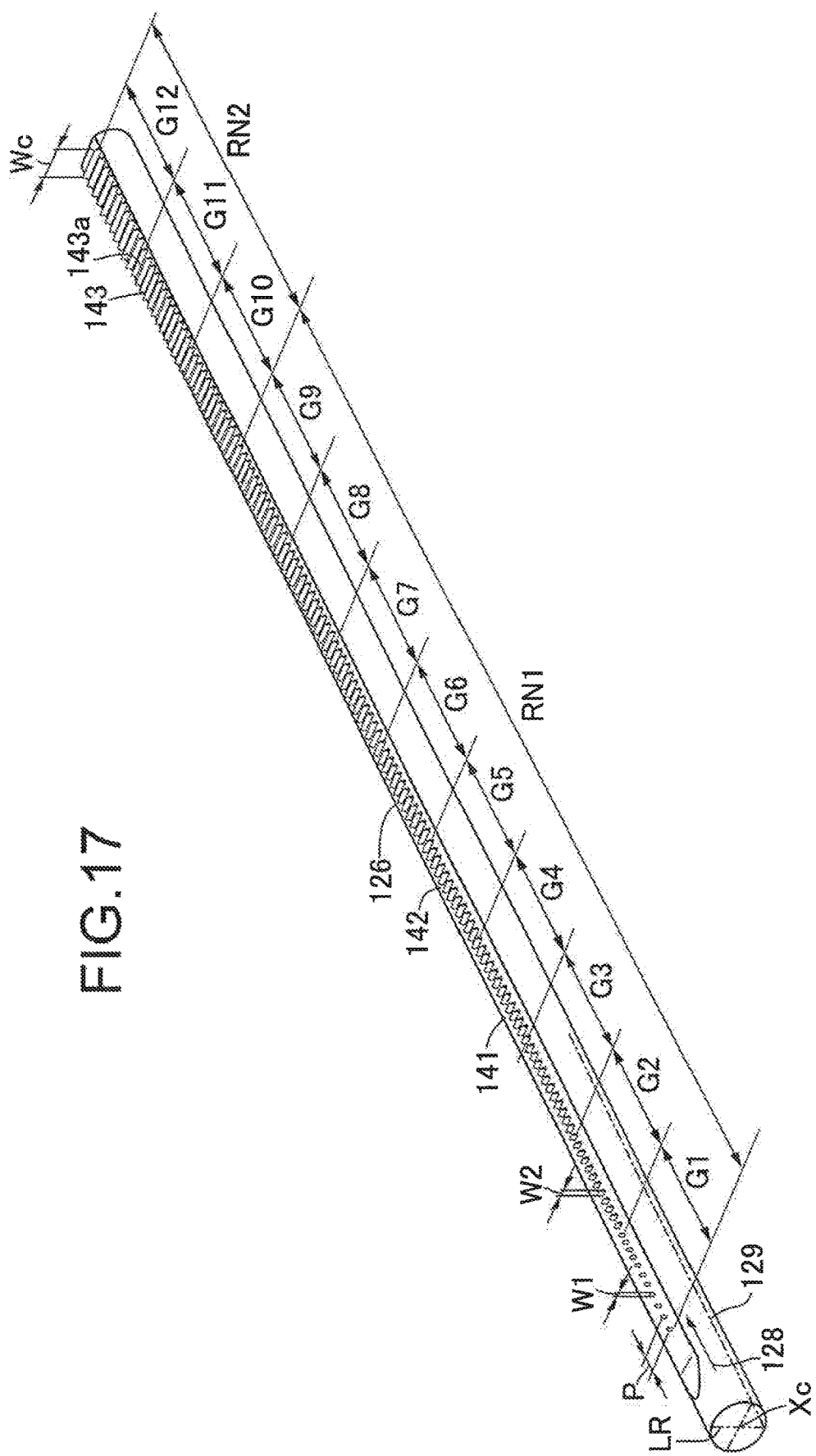
FIG. 17 is an enlarged perspective view of a light guide body.

As shown in FIG. 17, the light guide body 126 has a reflection face 141 that refracts and reflects light toward the linear light-emitting face 129 extending in the direction of entry of light 128. A plane 142 is defined on the reflection face 141. The plane 142 describes a chord in a cross section orthogonal to the central axis. The width of the plane 142 (length of chord) is maintained to be constant in the linear direction. The light guide body 126 is molded from a transparent resin material such as for example a methacrylic resin.

Formed on the plane 142 are projecting parts 143 arranged in the linear direction of the light guide body 126 and extending in a direction orthogonal to the direction of entry of light. The projecting parts 143 are arranged with a constant pitch P through the entire region in the linear direction. The projecting part 143 is formed so as to have a triangular cross section having a ridge line 143a in a direction orthogonal to the direction of entry of light (the linear direction of the light guide body 126). The ridge line 143a may be a curved face formed by chamfering.

The length of the projecting part 143 increases in going away from the light source 127 within a first range RN1 from the light source 127. The length of the projecting part 143 corresponds to the width of the projecting part 143 measured in a direction orthogonal to the direction of entry of light (the linear direction). Here, the projecting parts 143 are grouped in the linear direction of the light guide body 27, and the length (width) W1, W2 of the projecting parts 143 is set to be constant among groups G1 to G9. The number of projecting parts 143 is set to be constant among the individual groups G1 to G9. The individual projecting parts 143 are formed into a symmetrical shape with respect to a plane of symmetry LR containing the central axis of the light guide body 126. The height of the projecting part 143 within the first range RN1 is constant for all of the projecting parts 143.

Figure 18:
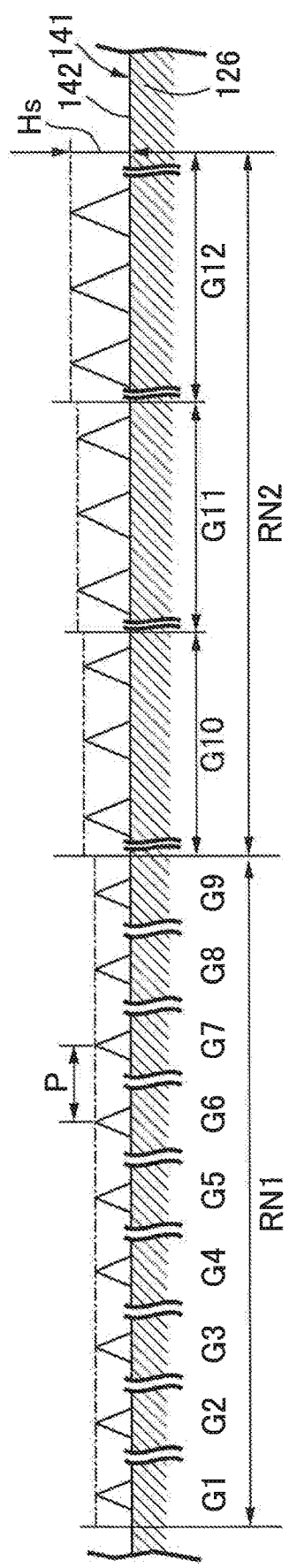
FIG. 18 is an enlarged partial sectional view of the light guide body.

A length We of the projecting parts 143 is constant in a second range RN2 that is beyond the first range RN1 from the light source 127. On the other hand, as shown in FIG. 18, a height Hs of the projecting part 143 increases in going away from the light source 127. Here, the projecting parts 143 are grouped in the linear direction of the light guide body 126, and the height Hs of the projecting parts 143 is set to be constant among groups G10 to G12. The number of projecting parts 143 is set to be constant among the individual groups G10 to G12. The individual projecting parts 143 are formed into a symmetrical shape with respect to the plane of symmetry LR containing the central axis of the light guide body 126. The cross-sectional shapes of the projecting parts 143 appear as similar figures on the plane of symmetry LR.

As shown in FIG. 15(B), the light guide body 126 has a semicolumnar body 145 that is partitioned by a virtual plane VP defined in parallel to the plane 142 of the reflection face 141 between the light-emitting face 129 and the reflection face 141 and is in contact with the horizontal wall 131 of the support body 119b and the latching piece 134b of the second restriction piece 134. That is, a gap SC between the horizontal wall 131 and the latching piece 134b at the second position is set to be smaller than the diameter of the semicolumnar body 145. Formed on the light guide body 126 is a curved face 146 that is continuous from one end of the curved face of the semicolumnar body 145, spreads toward the reflection face 141, and makes contact with the latching piece 134b of the second restriction piece 134 when displaced along the surface of the horizontal wall 131. The curved face 146 is curved with the same curvature as that of the curved face of the semicolumnar body 145. The curved face 146 generates a driving force that makes the latching piece 134b move away from the horizontal wall 131 when the light guide body 126 is pushed in between the latching piece 134b and the horizontal wall 131 along the surface of the horizontal wall 131.

The operation of the present embodiment is now explained. When the light source 127 emits light, the light advances within the light guide body 126 in the linear direction (the longitudinal direction) of the light guide body 126. The light is diffusely reflected by the projecting part 143 on the back face of the light-emitting face 129 and refracted in an orientation orthogonal to the linear direction. The refracted light is emitted to the outside via the light-emitting face 129. The light thus emitted escapes from the gap 139 between the upper door lining 118b and the decorative cover. In this way, the door trim 113 can be decorated by linear light emission.

A method for manufacturing the vehicle door 111 is now explained. The decorative cover 119 is mounted on the door main body 112. The decorative cover 119 is secured to the door main body 112 by means of the screw 138. The illumination device 123 is mounted on the decorative cover 119. Prior to the decorative cover 119 being mounted, the light guide body 126 may be fitted onto the decorative cover 119.

When mounting the illumination device 123, the light guide body 126 is guided along the surface of the support body 119b. The light guide body 126 is pushed in toward the vertical wall 132 along the surface of the horizontal wall 131. The light guide body 126 makes contact with the latching piece 134b of the second restriction piece 134 via the curved face 146, which is continuous from the curved face of the semicolumnar body 145 toward the reflection face 141. The force that pushes in the light guide body 126 is therefore converted to a driving force that makes the latching piece 134b move away from the horizontal wall 131.

The latching piece 134b of the second restriction piece 134 is displaced to the second position based on elastic deformation of the plate piece 134a. A gap is ensured between the second restriction piece 134 and the support body 119b. The light guide body 126 moves along the surface of the support body 119b in an orientation orthogonal to the central axis. The light guide body 126 passes through between the upper door lining 118b and the support body 119b.

The light guide body 126 is abutted against the rib 135 of the first restriction piece 133. Movement of the light guide body 126 is therefore restricted. The latching piece 134b returns to the first position based on the elasticity of the plate piece 134a. The latching piece 134b of the second restriction piece 134 presses the light guide body 126 against the support body 119b and the first restriction piece 133. The light guide body 126 is thus mounted on the decorative cover 119.

The door lining 118 is subsequently fixed to the door main body 112. The upper door lining 118b makes contact with the projecting piece 136 of the second restriction piece 134. As a result, the latching piece 134b of the second restriction piece 134 is restrained at the first position. Since the door lining 118 has high stiffness, the light guide body 126 can be retained well between the second restriction piece 134 and the horizontal wall 131 and first restriction piece 133. The light guide body 126 can be prevented from falling out. The light guide body 126 can thus be fixed well onto the decorative cover 119.

In the present embodiment, formed on the second restriction piece 134 is the projecting piece 136 making contact with the upper door lining 118b. Due to the magnitude (height) of the projecting piece 136 being adjusted, the pushing force transmitted to the second restriction piece 134 is adjusted. The light guide body 126 is thus fixed well onto the support body 119b of the decorative cover 119.

In the door trim 113 related to the present embodiment, the first restriction piece 133 and the second restriction piece 134 are disposed so as to be displaced in the linear direction of the light guide body 126. Elastic deformation of the light guide body 126 and the support body 119b can be utilized for the displacement of the second restriction piece 134. The light guide body 126 can therefore easily pass through between the second restriction piece 134 and the support body 119b.

The upper door lining 118b related to the present embodiment includes a wall member that covers the light guide body 126, the first restriction piece 133, and the second restriction piece 134 while forming the gap 139, via which light of the light guide body 126 leaks between the wall member and the support body 119b, and that makes contact with the second restriction piece 134 via an inner face. The decorative cover 119 and the upper door lining 118b in combination form the appearance of the door trim 113. The gap 139 enables indirect lighting in which light of the light guide body 126 is made to leak to be realized. Since the upper door lining 118b thus functions also as a fixing member for the illumination device 123, when restraining the second restriction piece 134 any increase in the number of components can be avoided.

The light guide body 126 related to the present embodiment has a semicolumnar body that is partitioned by a virtual plane defined in parallel with the reflection face 141 between the light-emitting face 129 and the reflection face 141 and makes contact with the support body 119b and the second restriction piece 134. Since the support body 119b and the second restriction piece 134 are in contact with the semicolumnar body of the light guide body 126, the light guide body 126 can be prevented from falling out between the support body 119b and the second restriction piece 134. The light guide body 126 can be fixed well onto the support body 119b.

As shown in FIG. 19, a buffer material 147 may be sandwiched between the upper door lining 118b and the projecting piece 136 of the second restriction piece 134. The upper door lining 118b and the projecting piece 136 are in contact with each other with the buffer material 147 sandwiched therebetween. When the buffer material 147 is thus sandwiched, the occurrence of an abnormal noise caused by friction between the upper door lining 118b and the second restriction piece 134 can be suppressed.

Figure 20:
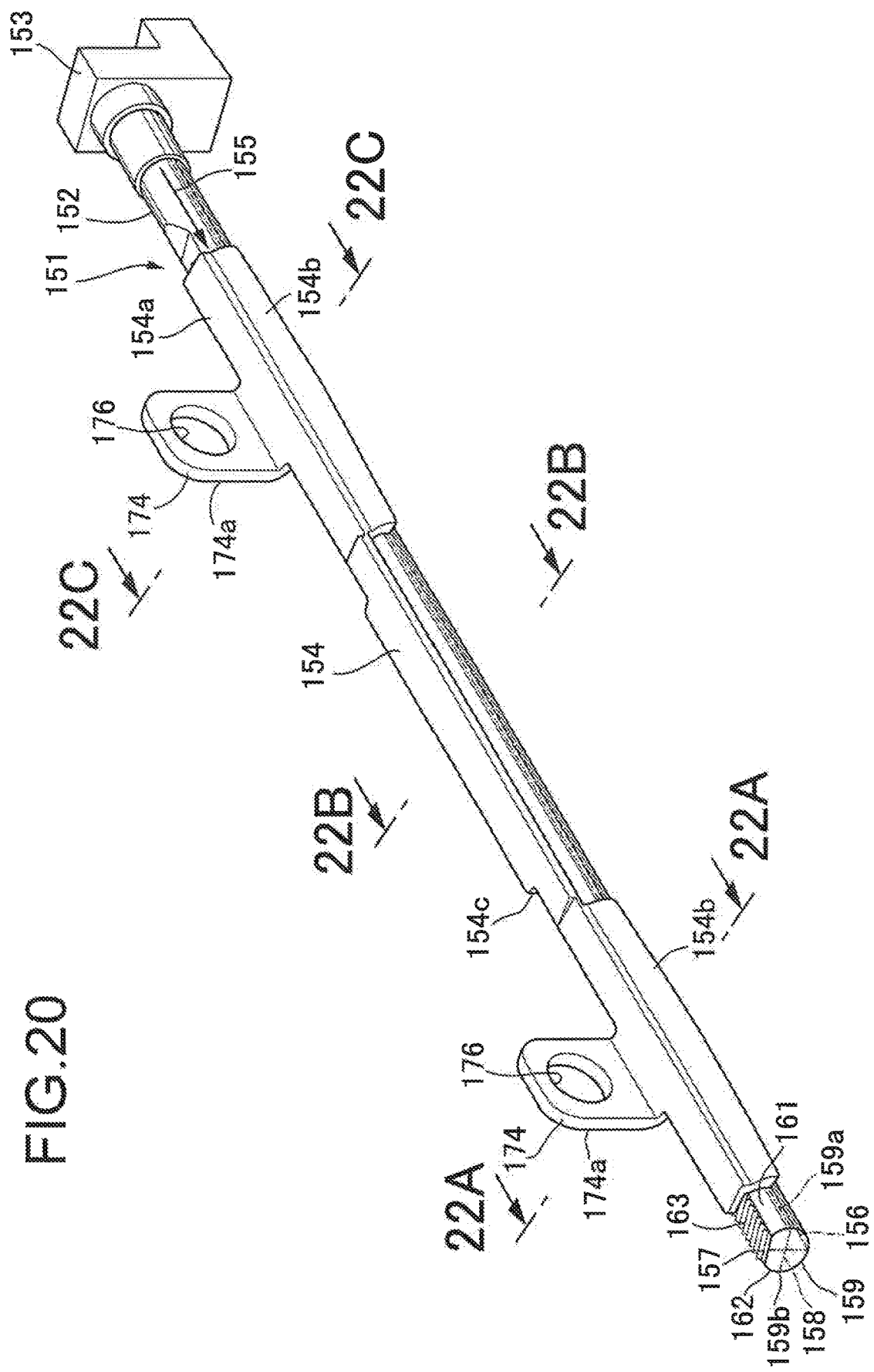
FIG. 20 is an enlarged perspective view of an illumination device related to a fourth embodiment of the present invention.

As shown in FIG. 20, an illumination device 151 related to a fourth embodiment includes a rod-shaped light guide body 152, a light source 153 connected to one end of the light guide body 152, and a fixing member 154 that has a main body 154a extending linearly in parallel with the light guide body 152 and fixes the light guide body 152 to the door trim 113. The light source 153 emits light from a light-emitting body in the linear direction of the light guide body 152 in response to the supply of electric power. The main body 154a of the fixing member 154 is formed from a plate material that is long in the linear direction of the light guide body 152.

The light guide body 152 extends linearly from the one end connected to the light source 153 in the direction of entry of light 155. The light guide body 152 has a reflection face 157 that refracts and reflects light toward a linear light-emitting face 156 extending in the direction of entry of light 155. The main body 154a of the fixing member 154 is made to face the reflection face 157 of the light guide body 152. The light guide body 152 is molded from a transparent resin material such as for example a methacrylic resin.

Figure 21:
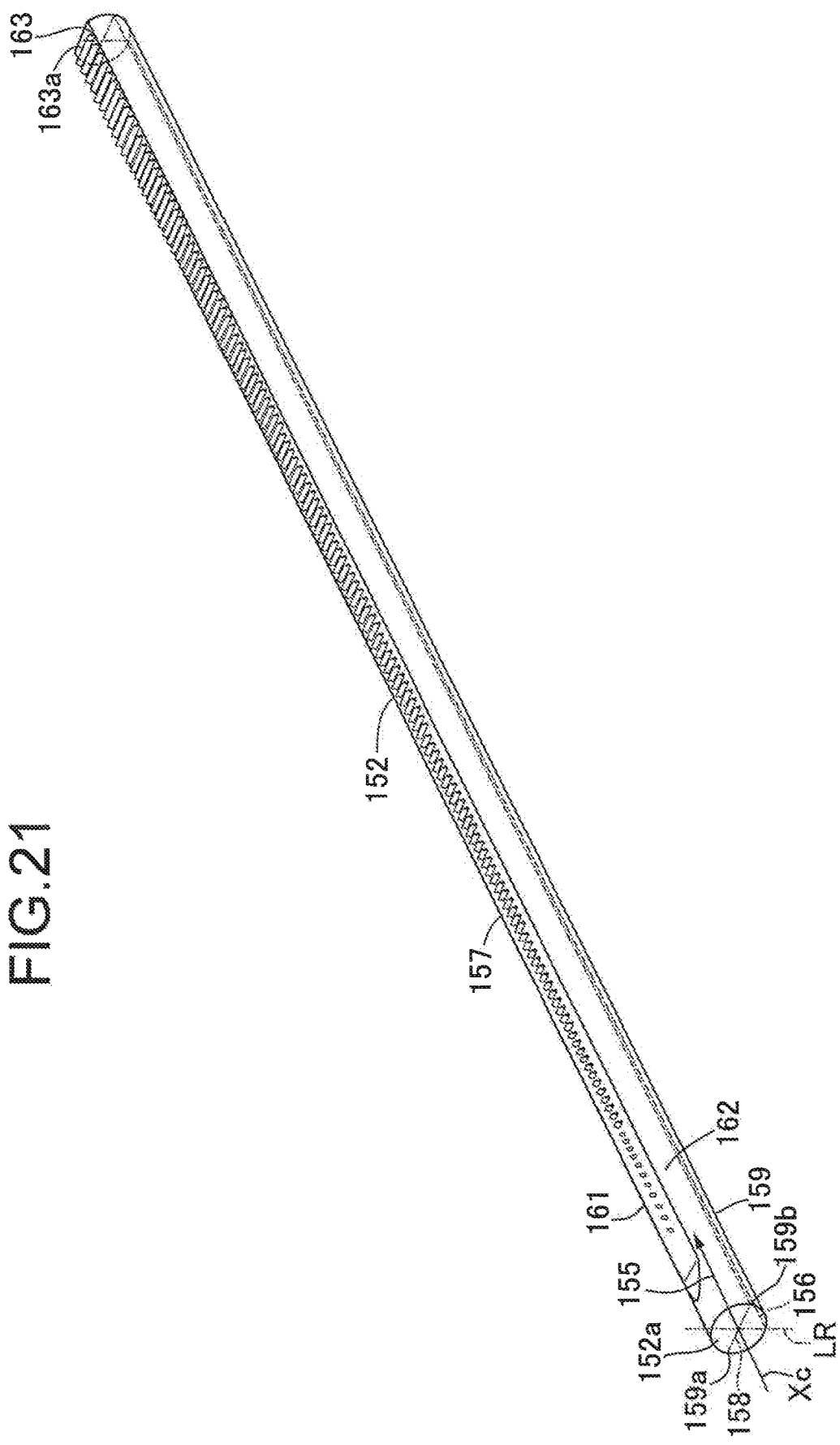
FIG. 21 is an enlarged perspective view of a light guide body.

As shown in FIG. 21, the light guide body 152 receives light from the light source 153 via one end face 152a. The light guide body 152 extends linearly in the direction of entry of light 155 orthogonal to the end face 152a. Light is transmitted within the light guide body 152 toward the other end in the direction of entry 155.

In the light guide body 152, a semicolumnar body 159 is partitioned by a virtual plane 158 defined in parallel with the reflection face 157 between the light-emitting face 156 and the reflection face 157. A curved face of the semicolumnar body 159 is connected to one ridge line of the reflection face 157 via a first curved face 161 that is continuous from one line of intersection 159a intersecting the virtual plane 158, and is connected to the other ridge line of the reflection face 157 via a second curved face 162 that is continuous from the other line of intersection 159b intersecting the virtual plane 158. The first curved face 161 and the second curved face 162 have the same curvature as that of the curved face of the semicolumnar body 159.

Formed on the reflection face 157 are a plurality of projecting parts 163 that protrude outward from the plane of the reflection face 157 and extend in a direction orthogonal to the direction of entry of light 155. The projecting parts 163 are arranged in the axial direction (the linear direction) of the light guide body 152. The projecting parts 163 may be disposed with a constant pitch P through the entire region in the axial direction. The plane of the reflection face 157 describes a chord in a cross section orthogonal to the central axis of the light guide body 152. The width (length of chord) of the plane is maintained to be constant in the linear direction.

The projecting part 163 may be formed so as to have a triangular cross section having a ridge line 163a in a direction orthogonal to the direction of entry of light 155 (the axial direction of the light guide body 152). The ridge line 163a may be a curved face formed by chamfering. When the height is set to be constant for all of the projecting parts 163, the length of the projecting part 163 in a direction orthogonal to the direction of entry of light 155 may increase in going away from the light source 153. The projecting part 163 may be formed in the same manner as for the projecting part 143.

As shown in FIG. 20, the fixing member 154 includes two first support bodies 154b extending from the main body 154a with a gap between them in the axial direction of the light guide body 152 while facing the first curved face 161, and one second support body 154c extending from the main body 154a while facing the second curved face 162 at a position facing a space formed between the first support bodies 154b. Here, the second support body 154c is disposed at a position that deviates from the first support body 154b in the axial direction of the light guide body 152. The main body 154a, the first support body 154b, and the second support body 154c may be molded integrally from for example a resin material.

As shown in FIG. 22(A) and FIG. 22(C), the fixing member 154 has two first projections 164 that are in contact with the curved face of the semicolumnar body 159 in two first cross sections SF that are orthogonal to the central axis of the light guide body 152 and are separated in the axial direction. In the first cross section SF, the first curved face 161 is continuous from a first end (one end) of the curved face of the semicolumnar body 159 (the line of intersection 159a) toward the reflection face 157. Here, as shown in FIG. 23(A), the first projections 164 protrude from inner faces of the individual first support bodies 154b. The first projection 164 is in contact with the curved face of the semicolumnar body 159 via a partially spherical surface (for example, a spherical cap). As shown in FIG. 22(A) and FIG. 22(C), formed on the first support body 154b is a rotation stop 165 that makes contact with an end of the projecting part 163 in the peripheral direction around the central axis of the semicolumnar body 159.

As shown in FIG. 22(B), the fixing member 154 has a second projection 166 that is in contact with the curved face of the semicolumnar body 159 in a second cross section SS disposed between the two first cross sections SF and orthogonal to the central axis of the light guide body 152. In the second cross section SS, the second curved face 162 is continuous from a second end (the other end with respect to the one end) of the curved face of the semicolumnar body 159 (the line of intersection 159b) toward the reflection face 157. Here, as shown in FIG. 23(B), the second projection 166 protrudes from an inner face of the second support body 154c. The second projection 166 is in contact with the curved face of the semicolumnar body 159 via a partially spherical surface (for example, a spherical cap). As shown in FIG. 22(B), formed on the second support body 154c is a rotation stop 167 that makes contact with an end of the projecting part 163 in the peripheral direction around the central axis of the semicolumnar body 159.

Figure 22:
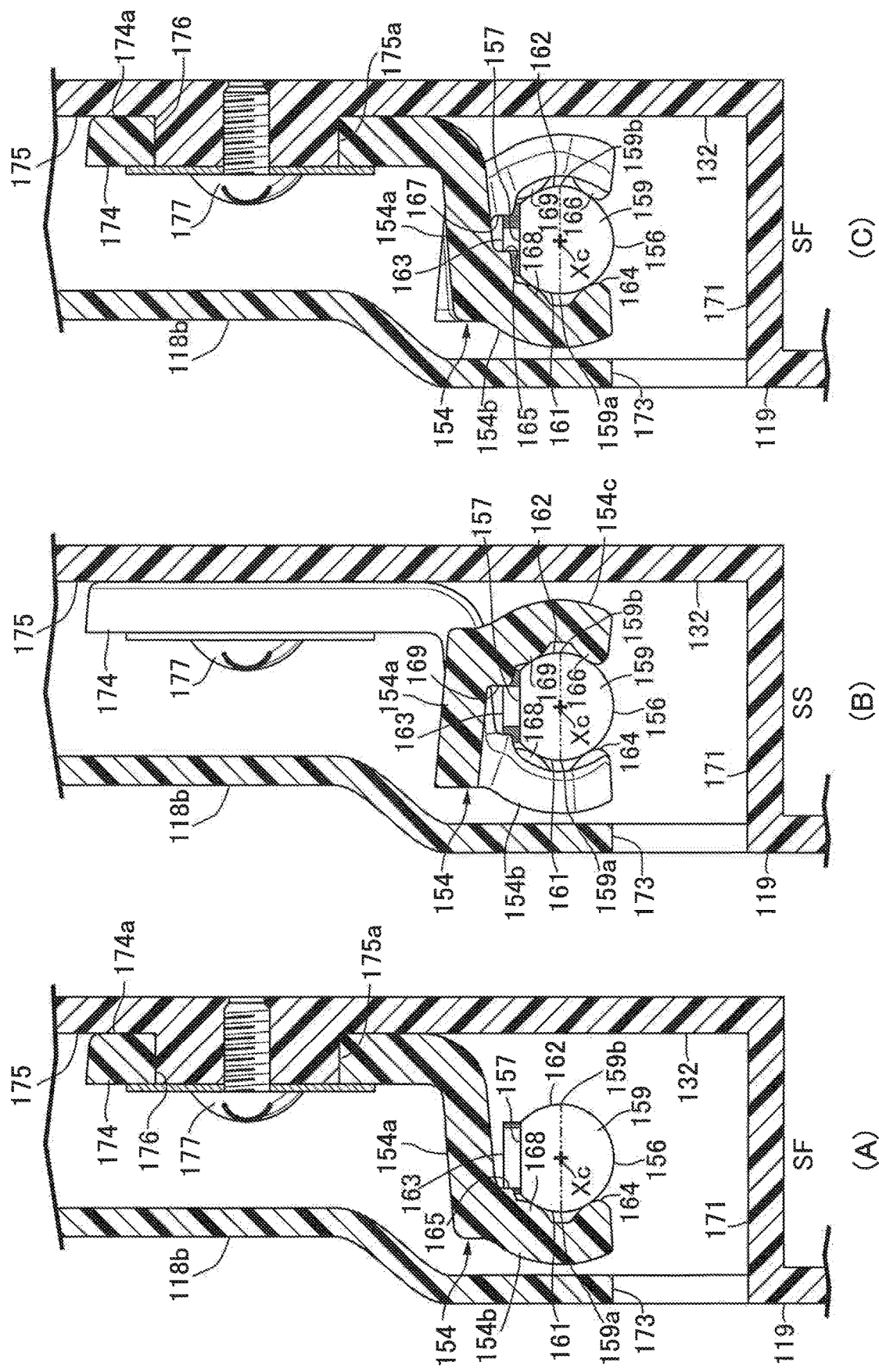
FIG. 22(A) is a sectional view along line 22A-22A in FIG. 20.
FIG. 22(B) is a sectional view along line 22B-22B in FIG. 20.
FIG. 22(C) is a sectional view along line 22C-22C in FIG. 20.
Figure 23:
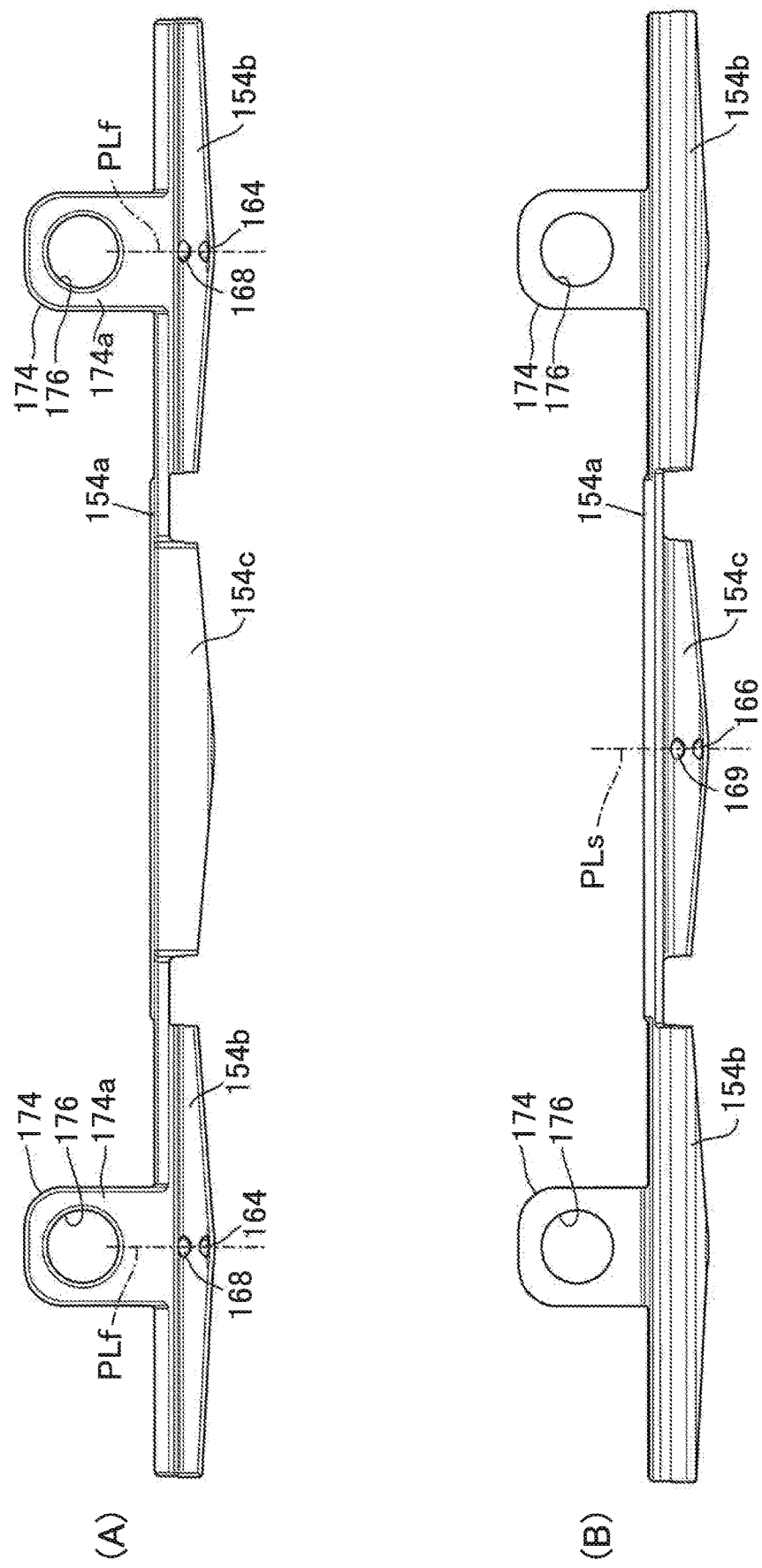
FIG. 23(A) is an enlarged front view of a fixing member and FIG. 23(B) is an enlarged rear view of the fixing member.

As shown in FIG. 22, the fixing member 154 has a third projection 168 that makes contact with the first curved face 161 in the first cross section SF so as to correspond to the individual first projections 164, and a fourth projection 169 hat makes contact with the second curved face 162 in the second cross section SS so as to correspond to the second projection 166. As shown in FIG. 23(A), the third projection 168 protrudes from the inner face of the first support body 154b. The third projection 168 makes contact with the first curved face 161 via a partially spherical surface (for example, a spherical cap). The centers of the first projection 164 and the third projection 168 are positioned on a virtual plane PLf orthogonal to the central axis of the light guide body 152. As shown in FIG. 23(B), the fourth projection 169 protrudes from the inner face of the second support body 154c. The fourth projection 169 makes contact with the second curved face 162 via a partially spherical surface (for example, a spherical cap). The centers of the second projection 166 and the fourth projection 169 are positioned on a virtual plane PLs orthogonal to the central axis of the light guide body 152.

As shown in FIG. 22, the light-emitting face 156 of the light guide body 152 is made to face an irradiated body 171 of the decorative cover 119. The upper door lining 118b covers the illumination device 151 above the irradiated body 171. A gap 173 opening toward a compartment of a vehicle is defined between the upper door lining 118b and the irradiated body 171. An occupant on a driver's seat or a passenger seat can glimpse the surface of the irradiated body 171 via the gap 173.

As shown in FIG. 20, a mounting piece 174 is formed integrally with the main body 154a at positions corresponding to the two first support bodies 154b in the axial direction. A superimposing face 174a is formed on the mounting piece 174. The mounting piece 174 is superimposed on a mounting face 175 on the decorative cover 119 side via the superimposing face 174a. Formed in the mounting piece 174 is a mounting hole 176 having an axis orthogonal to the superimposing face 174a. For example, a mounting boss 175a protruding from the mounting face 175 of the decorative cover 119 can be inserted into the mounting hole 176. The fixing member 154 is fixed to the decorative cover 119 by means of a screw 177 screwed into the mounting boss 175a.

The operation of the present embodiment is now explained. When the light source 153 emits light, the light advances within the light guide body 152 in the linear direction (the longitudinal direction) of the light guide body 152. The light is diffusely reflected by the projecting part 163 on the back face of the light-emitting face 156 and refracted in an orientation orthogonal to the linear direction. The refracted light is emitted outward from the light-emitting face 156. The light thus emitted shines on the irradiated body 171 as shown in FIG. 22. The door trim 113 can thus be decorated based on linear emission of light.

In the present embodiment, the fixing member 154 provides three point support for at least the semicolumnar body 159 of the light guide body 152 by means of the two first projections 164 and the second projection 166 disposed between the first projections 164 in the axial direction. Due to the three point support the light guide body 152 is retained on the fixing member 154 so as to be parallel to the main body 154a. The first projection 164 and the third projection 168 can restrain movement of the light guide body 152 in a direction orthogonal to the virtual plane 158 by making contact with the curved face of the semicolumnar body 159 and the first curved face 161. Similarly, due to the second projection 166 and the fourth projection 169 making contact with the curved face of the semicolumnar body 159 and the second curved face 162, movement of the light guide body 152 orthogonal to the virtual plane 158 can be restrained. It is thus possible to prevent the light guide body 152 from rattling with respect to the fixing member 154.

The rotation stop 165 of the first support body 154b restrains rotational movement of the light guide body 152 in a first direction around a central axis Xc of the semicolumnar body 159. The rotation stop 167 of the second support body 154c restrains rotational movement of the light guide body 152 in a second direction that is opposite to the first direction around the central axis Xc of the semicolumnar body 159. The position of the light-emitting face 156 of the light guide body 152 with respect to the fixing member 154 around the central axis Xc of the semicolumnar body 159 is therefore fixed. The orientation of light with respect to the irradiated body 171 of the decorative cover 119 can be set well.

When assembling the illumination device 151, the light guide body 152 is fitted to the fixing member 154. As shown in FIG. 24, the first curved face 161 and the second curved face 162 of the light guide body 152 are in contact with the first projection 164 on the first support body 154b and the second projection 166 on the second support body 154c respectively. The light guide body 152 is pressed in toward the main body 154a in a direction orthogonal to the virtual plane 158. When the light guide body 152 passes through a space sandwiched between the first projection 164 and the second projection 166, the first curved face 161 and the second curved face 162 of the light guide body 152 push and widen the first support body 154b and the second support body 154c.

In this arrangement, since a side face of the light guide body 152 is in contact with partially spherical surfaces of the first projection 35 and the second projection 36, it does not make contact with the fixing member 154 over the entire length, and scratches that might occur on an outer face of the light guide body 152 can be suppressed. The transmission of light within the light guide body 152 can be maintained well. Since the first support body 154b and the second support body 154c are present at positions separated from each other in the axial direction, when the first support body 154b and the second support body 154c are pushed and widened, twisting of the main body 154a of the fixing member 154 is utilized when displacing the first projection 164 and the second projection 166. As a result, the elasticity required for the first support body 154b and the second support body 154c can be suppressed. The stiffness of the fixing member 154 can be enhanced.

When the light guide body 152 passes through the space sandwiched between the first projection 164 and the second projection 166, the first projection 164 and the second projection 166 make contact with the curved face of the semicolumnar body 159 of the light guide body 152. The light guide body 152 is pushed in toward the main body 154a by virtue of the restoring force of the first support body 154b and the second support body 154c. The third projection 168 and the fourth projection 169 make contact with the first curved face 161 and the second curved face 162 respectively of the light guide body 152. The rotation stops 165, 67 engage with one end of the projecting part 163.

Figure 25:
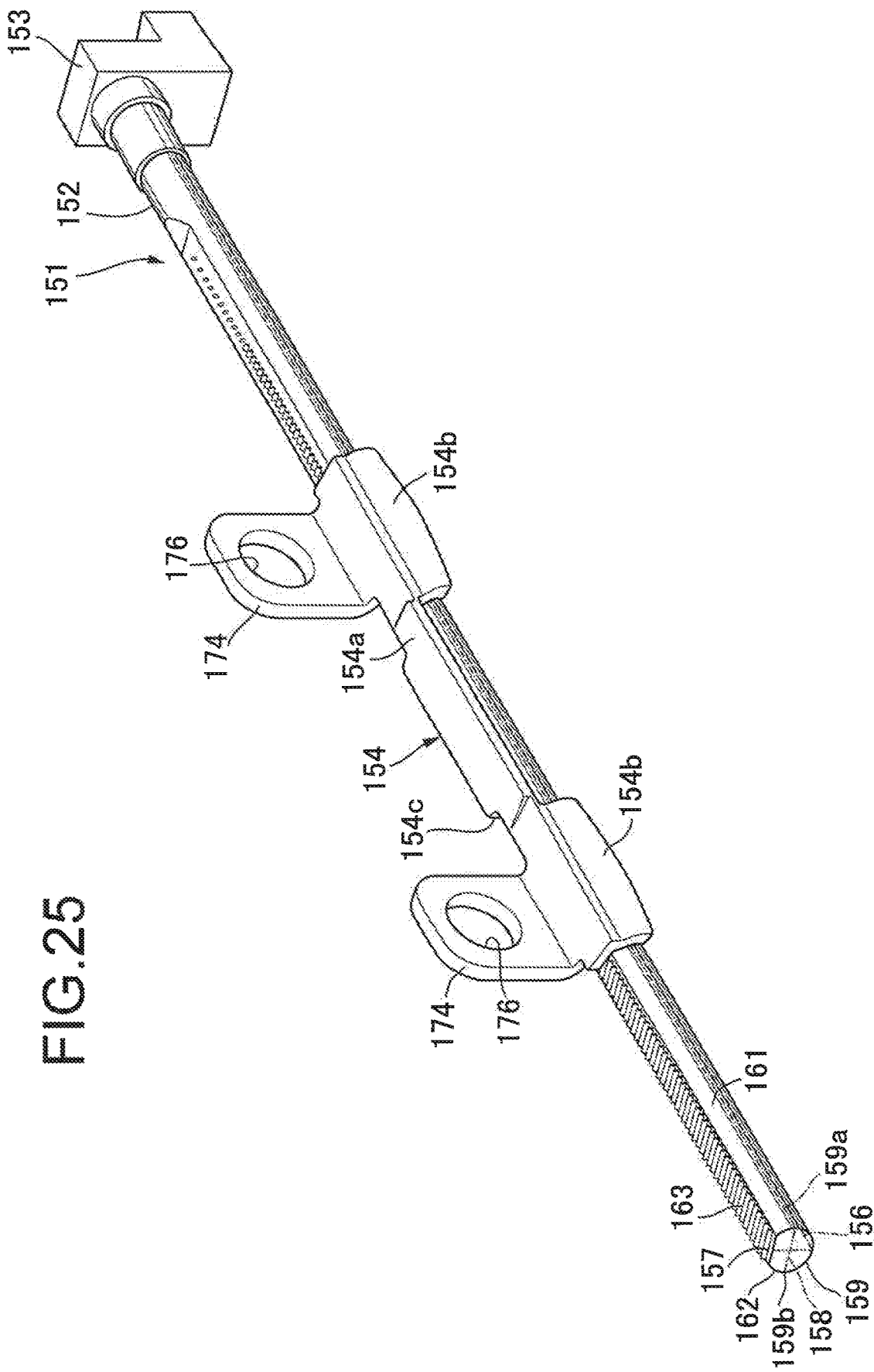
FIG. 25 is an enlarged perspective view, corresponding to FIG. 20, of an illumination device equipped with the fixing member having a length that is shorter than ½ of the length of the light guide body in the axial direction.
Figure 26:
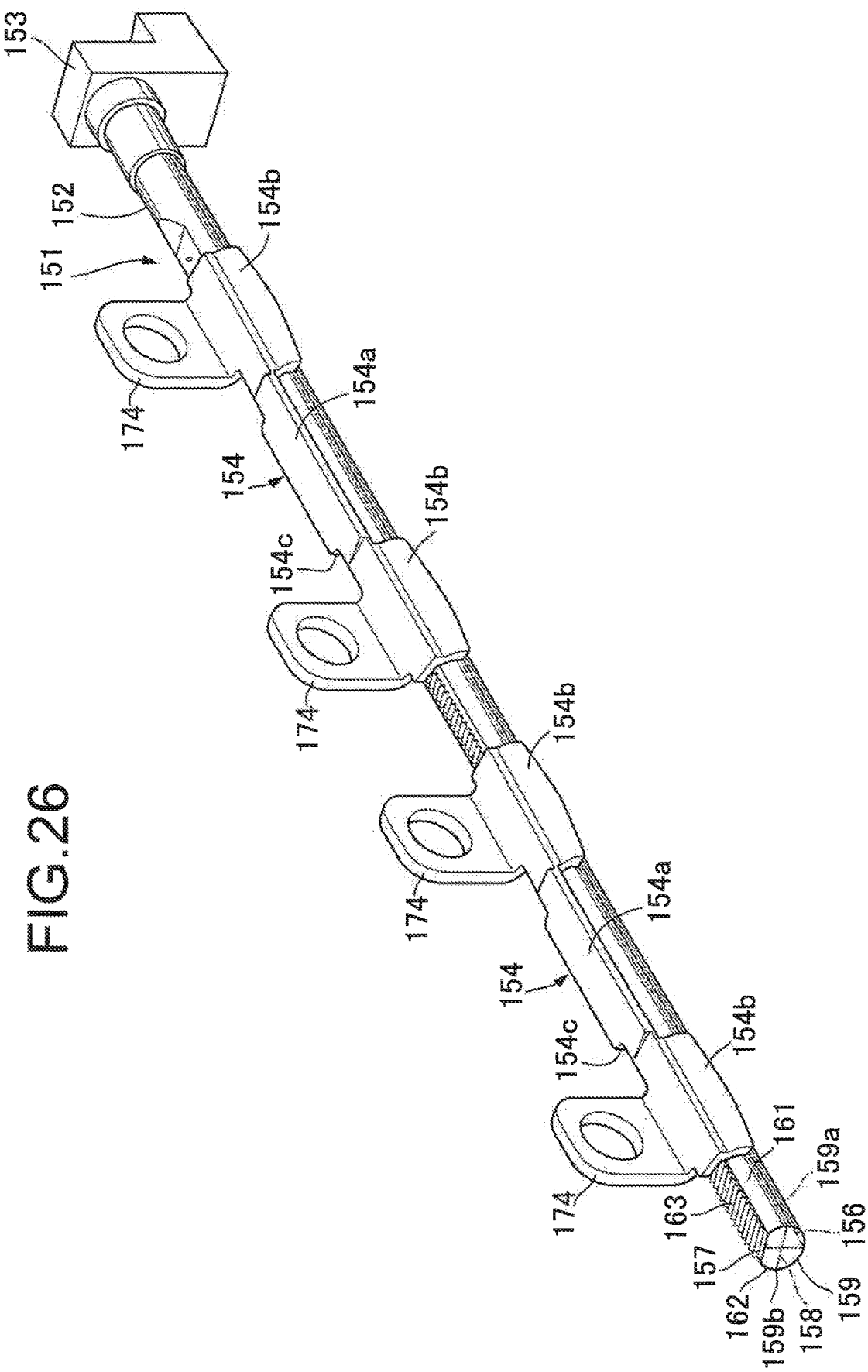
FIG. 26 is an enlarged perspective view, corresponding to FIG. 20, of an illumination device equipped with two fixing members per light guide body.
Figure 27:
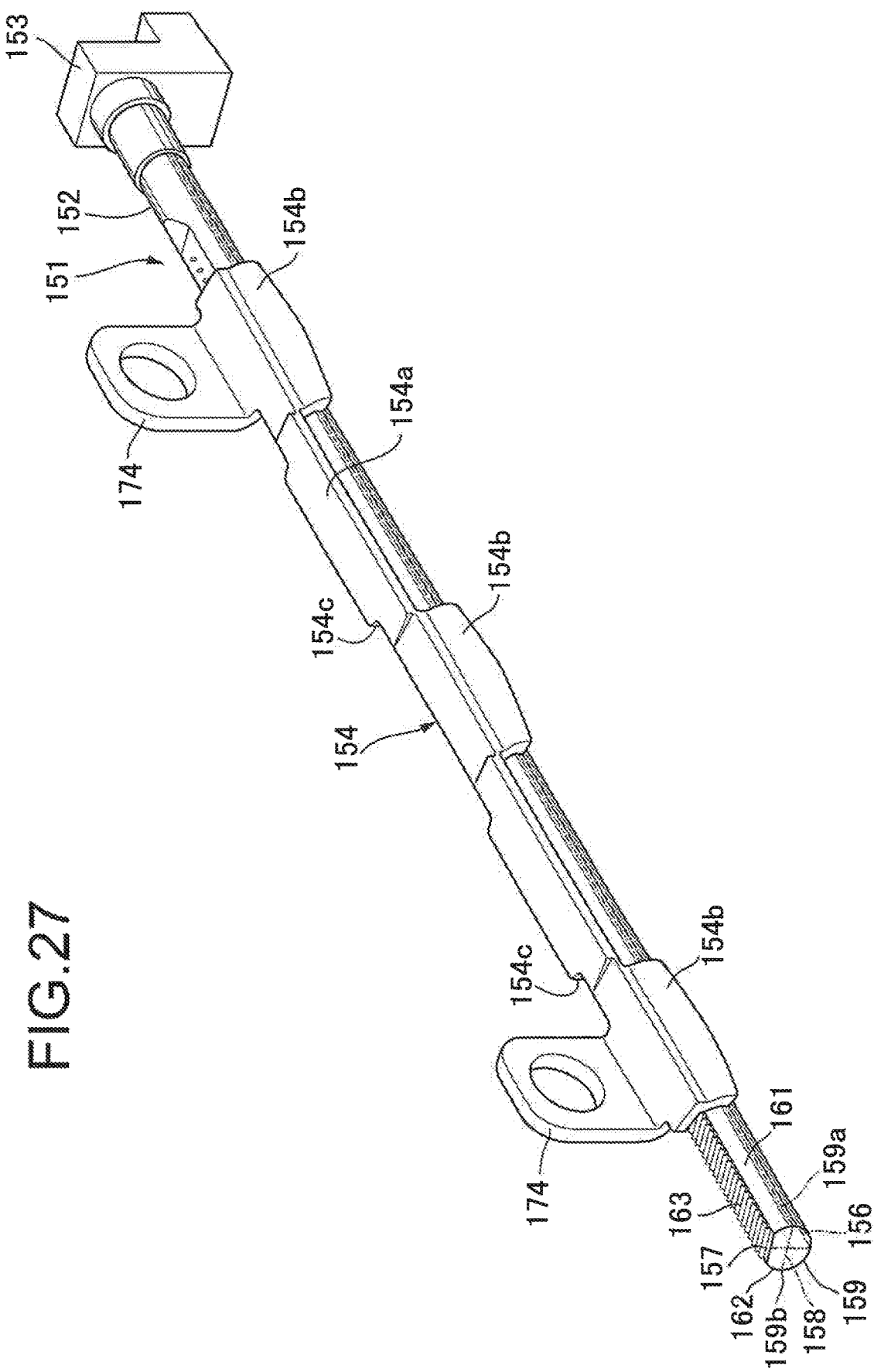
FIG. 27 is an enlarged perspective view, corresponding to FIG. 20, of an illumination device that includes a fixing member having two second support bodies alternatingly disposed on a first support body in the axial direction.

As shown in FIG. 20 the fixing member 154 may include a main body 154a that has a length coinciding with the overall length of the light guide body 152 in the axial direction of the light guide body 152, and as shown in FIG. 25 it may include a main body 154a that has a length shorter than half the length of the light guide body 152 in the axial direction. As shown in FIG. 26, two or more fixing members 154 may be arranged in the axial direction with respect to one light guide body 152. The fixing member 154 may include two or more second support bodies 154c alternatingly disposed with the first support body 154b as shown in FIG. 27. The individual first support bodies 154b and second support bodies 154c may be formed in the same manner as for the first support body 154b and the second support body 154c described above. In the individual fixing members 154, the two first support bodies 154b may be made continuous by being connected to each other. The first support body 154b and the second support body 154c may face each other with the light guide body 152 sandwiched therebetween.

The invention claimed is:

1. A vehicle interior component comprising: a rod shaped long light guide body that extends linearly in a direction of entry of light from one end thereof, the light guide body comprising: a light-emitting face that extends linearly in the direction of entry of light; and a reflection face that reflects light transmitted in the direction of entry of light, toward the light-emitting face; a support body having a surface that guides movement of the light guide body in a specific direction orthogonal to a central axis of the light guide body; a first restriction piece formed on the support body to restrict movement of the light guide body guided in the specific direction; a second restriction piece configured to deform elastically with respect to the support body between a first position in which the second restriction piece presses the light guide body against the support body and the first restriction piece, and a second position in which a gap is formed between the second restriction piece and the support body to allow the light guide body to pass through between the second restriction piece and the support body; and a fixing member having a higher stiffness than a stiffness of the second restriction piece, the fixing member retaining the second restriction piece at the first position.

2. The vehicle interior component according to claim 1, wherein a projecting piece is formed on one of the fixing member and the second restriction piece and is in contact with the other of the fixing member and the second restriction piece.

3. The vehicle interior component according to claim 1, wherein the first restriction piece and the second restriction piece are disposed along the light guide body and displaced with respect to one another in the direction of entry of light.

4. The vehicle interior component according to claim 1, wherein the fixing member is a wall member that covers the light guide body, the first restriction piece and the second restriction piece, with a gap being formed between the fixing member and the support body through which light of the light guide body leaks out, the wall member having an inner face in contact with the second restriction piece.

5. The vehicle interior component according to claim 1, wherein the light guide body has a semicolumnar body that is partitioned by a virtual plane parallel to the reflection face and defined between the light-emitting face and the reflection face, the semicolumnar body being in contact with the support body and the second restriction piece.

6. The vehicle interior component according to claim 1, wherein the fixing member and the second restriction piece are in contact with each other with a buffer material sandwiched therebetween.

7. The vehicle interior component according to claim 1, wherein a plurality of projecting parts are arranged on the reflection face, each of the projecting parts extending in a direction orthogonal to the direction of entry of light.

8. A vehicle door comprising the vehicle interior component according to claim 1.

9. The vehicle interior component according to claim 2, wherein the projecting piece is formed on the second restriction piece and is in contact with the fixing member.

* * * * *